United States Patent
Kumagai et al.

(10) Patent No.: US 8,294,385 B2
(45) Date of Patent: Oct. 23, 2012

(54) HIGH-PRESSURE DISCHARGE LAMP BALLAST WITH MULTI-MODE LAMP STARTING CIRCUIT

(75) Inventors: Jun Kumagai, Suita (JP); Nobutoshi Matsuzaki, Neyagawa (JP); Satoru Nagata, Kobe (JP)

(73) Assignee: Panasonic Corporation, Osaka (JP)

( * ) Notice: Subject to any disclaimer, the term of this patent is extended or adjusted under 35 U.S.C. 154(b) by 356 days.

(21) Appl. No.: 12/606,248

(22) Filed: Oct. 27, 2009

(65) Prior Publication Data

US 2010/0109543 A1    May 6, 2010

(30) Foreign Application Priority Data

Oct. 28, 2008    (JP) ................... 2008-277428

(51) Int. Cl.
*H05B 37/00* (2006.01)
(52) U.S. Cl. .................. 315/291; 315/209 R; 315/224
(58) Field of Classification Search .......... 315/307–311, 315/224, 225, 347, 209 R, 291
See application file for complete search history.

(56) References Cited

U.S. PATENT DOCUMENTS

| | | | |
|---|---|---|---|
| 5,770,926 A * | 6/1998 | Choi et al. | 315/307 |
| 5,914,571 A * | 6/1999 | Beasley | 315/244 |
| 5,932,976 A * | 8/1999 | Maheshwari et al. | 315/291 |
| 6,965,204 B2 * | 11/2005 | Langeslag | 315/209 R |
| 7,425,802 B2 * | 9/2008 | Kumagai et al. | 315/291 |
| 2008/0136353 A1 * | 6/2008 | Hsu | 315/307 |

FOREIGN PATENT DOCUMENTS

WO    WO03039206    5/2003

* cited by examiner

*Primary Examiner* — Douglas W Owens
*Assistant Examiner* — Amy Yang
(74) *Attorney, Agent, or Firm* — Waddey & Patterson, P.C.; Mark J. Patterson; Gary L. Montle

(57) ABSTRACT

An electronic ballast is provided for powering a high-pressure discharge lamp. A power supply circuit receives an AC input and provides a DC output in response to the AC input. An inverter circuit having a plurality of switching elements converts the DC output into an AC signal for the lamp. An LC resonant circuit is coupled between the inverter circuit and the lamp. A control circuit controls the switching operation of the switching elements, with the switching control associated with various operating modes. In an electrical breakdown mode the switching elements are controlled at a first switching frequency effective to provide a first resonant voltage and produce electrical breakdown of the lamp from an unlit state. In a high frequency preheat mode the switching elements after startup of the lamp are controlled at a second switching frequency lower than the first switching frequency to provide a current for preheating lamp electrodes. In a rectangular wave lighting mode the switching elements after preheating of the lamp electrodes is controlled to supply a rectangular wave AC signal to the lamp and maintain steady state lighting.

21 Claims, 15 Drawing Sheets

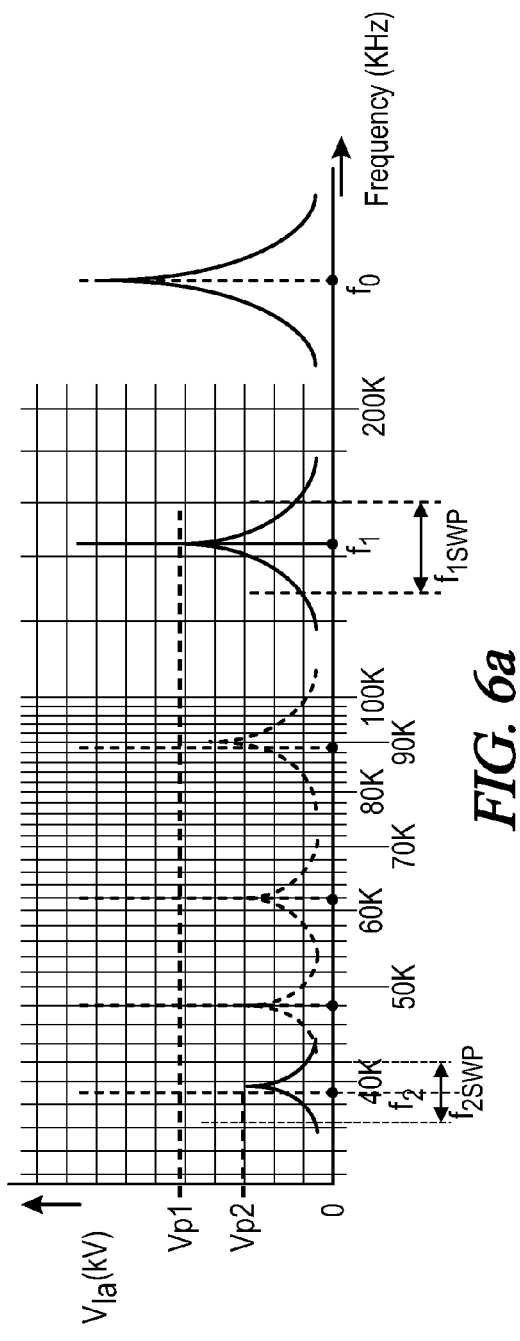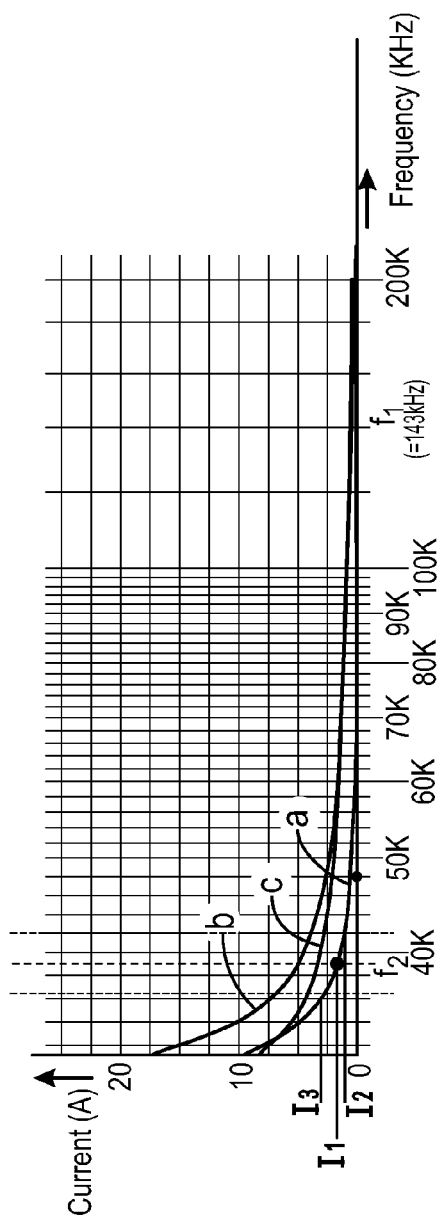
FIG. 6a
FIG. 6b

HIGH-PRESSURE DISCHARGE LAMP BALLAST WITH MULTI-MODE LAMP STARTING CIRCUIT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: JP2008-277428, filed Oct. 28 current, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to electronic ballasts for powering a high-pressure discharge lamps. More particularly, the present invention relates to an electronic ballast with multi-mode lamp starting circuitry.

An electronic ballast as known in the art for lighting a high pressure discharge lamp such as an HID lamp, typically includes a high starting voltage generated due to a resonant effect of an LC resonant circuit formed of an inductor and a capacitor and applied to start and light the high pressure discharge lamp.

The electronic ballast includes an AC/DC converting circuit for converting an AC power input to a DC power output, a DC/DC converter for generating a rectangular wave voltage by switching an output of the AC/DC converting circuit, a load circuit including the high pressure discharge lamp and coupled to receive the DC/DC converter output, and a control circuit for controlling switching operations of the AC/DC converting circuit and the DC/DC converter.

The control circuit controls the switching operations of the AC/DC converting circuit and the DC/DC converter so as to sequentially perform a resonant ignition phase for starting the high pressure discharge lamp, a warm-up phase for generating glow discharge and preheating lamp electrodes, and a steady-state operation phase for applying the rectangular wave voltage to the high pressure discharge lamp to maintain stable lighting of the high pressure discharge lamp.

That is, at startup and lighting of the lamp, first, by electrically resonating the inductor and the capacitor which form the LC resonant circuit in the resonant ignition phase, a sufficiently high starting voltage necessary for producing electrical breakdown of the discharge lamp is generated and the starting voltage is applied between both ends of the lamp.

Next, in the warm-up phase, by applying a voltage of a frequency which is relatively lower than the frequency in the resonant ignition phase to the lamp, glow discharge is generated to preheat the lamp electrodes. In the subsequent steady-state operation phase, by continuously generating arc discharge, stable lighting of the high pressure discharge lamp is maintained.

In many conventional electronic ballasts, when the lamp fades out in the warm-up phase, only a voltage up to a bus voltage of about 300V as the output of the DC/DC converter can be applied to the lamp as a restarting voltage. Thus, when the discharge lamp is completely extinguished, the lamp disadvantageously fails to start. When the lamp fails to start, the resonant ignition phase and the warm-up phase are repeatedly performed, increasing start-up time.

Because the high starting voltage is applied to the lamp in the resonant ignition phase, when the lamp does not start even if the starting voltage is continuously applied within one second, the discharge vapor pressure in a glass bulb needs to be decreased prior to restart and, after a down time from a few seconds to a few minutes, the high starting voltage is applied again. Therefore, in the electronic ballast as conventionally known in the art, even if the lamp is able to be started, the down time from a few seconds to a few minutes is necessarily provided, thereby delaying startup of the lamp.

BRIEF SUMMARY OF THE INVENTION

The present invention is made in consideration of the above-mentioned problem, and an object of the present invention is thereby to provide an electronic ballast with improved starting ability for a high pressure discharge lamp.

To attain the above-mentioned object, according to an aspect of the invention, an electronic ballast includes a DC chopper circuit, a starting circuit including an LC resonant circuit and arranged to generate a starting voltage for producing electrical breakdown of a discharge lamp by switching an output of the DC chopper circuit, an inverter circuit for converting the output of the DC chopper circuit into a rectangular wave AC by switching and supplying the AC to a load circuit including the high pressure discharge lamp for stable lighting of the high pressure discharge lamp, and a control circuit.

The control circuit is arranged to sequentially switch operation of the starting circuit and the inverter circuit among three modes: an electrical breakdown mode for producing electrical breakdown of the high pressure discharge lamp, a high frequency preheat mode for supplying a preheat current to the lamp and preheating lamp electrodes, and a rectangular wave lighting mode for supplying the rectangular wave AC to the high pressure discharge lamp for maintaining stable lighting of the lamp.

The control circuit in the electrical breakdown mode generates the starting voltage by switching the switching element of the starting circuit around a first switching frequency which is $1/(n)$ (where n is an odd integer, for example a first switching frequency of one third) of a resonant frequency of the LC resonant circuit. The control circuit in the high frequency preheat mode supplies a high frequency voltage obtained by switching the switching element of the starting circuit to the load circuit around a second switching frequency which is lower than the first switching frequency and also $1/(n)$ of the resonant frequency.

According to another aspect of the invention, the control circuit, in the high-frequency preheat mode, controls the switching frequency of the starting circuit to sweep through a predetermined frequency range including the second switching frequency. The predetermined frequency range may include a frequency band greater than but near to frequency characteristics of the LC resonant circuit and the load circuit with the high pressure discharge lamp in a lit condition.

According to another aspect of the invention, in shifting from the electrical breakdown mode to the high frequency preheat mode, the control circuit gradually lowers the switching frequency of the starting circuit over time from around the first switching frequency to around the second switching frequency. Alternatively, in shifting from the electrical breakdown mode to the high frequency preheat mode, the control circuit may lower the switching frequency of the starting circuit from around the first switching frequency to around the second switching frequency in stages. In lowering the switching frequency in stages, the control circuit may set one or more intermediate frequencies which are lower than the first switching frequency and higher than the second switching frequency and are equal to 1/(n) of the resonant frequency, and lower the switching frequency from the first switching frequency to the second switching frequency through the one or more intermediate frequencies in stages.

According to another aspect of the invention, a lighting fixture includes a electronic ballast of the present invention and a discharge lamp receiving electrical power from the electronic ballast.

In switching the operation mode of the electronic ballast from the electrical breakdown mode to the high frequency preheat mode, because the control circuit switches the starting circuit around the second switching frequency which is lower than the first switching frequency in the electrical breakdown mode and is equal to 1/(n) of the resonant frequency of the LC resonant circuit, when fade-out occurs in the high frequency preheat mode, the resonant voltage which is higher than the output of the DC chopper circuit can be applied to the high pressure discharge lamp due to the resonant effect of the LC resonant circuit. Therefore, the lamp can be easily lit again and the ability of the high pressure discharge lamp to start can be improved.

When fade-out occurs in the high frequency preheat mode, the control circuit sweeps the switching frequency of the starting circuit in the predetermined frequency range including the second switching frequency. Accordingly, as the switching frequency gets closer to the resonant frequency, resonant is enforced and the resonant voltage which is higher than the output of the DC chopper circuit can be applied to the high pressure discharge lamp due to the resonance effect of the LC resonant circuit. Therefore, the high pressure discharge lamp can be easily lit again and the starting ability of the lamp can be improved.

As the control circuit lowers the switching frequency in the high frequency preheat mode, the lamp current supplied to the high pressure discharge lamp is increased. Therefore, both the lamp electrodes of the high pressure discharge lamp can be sufficiently heated and glow discharge can be shifted to arc discharge more easily.

When the electrical breakdown mode is shifted to the high frequency preheat mode by gradually lowering the switching frequency, a charging current to the capacitor forming the LC resonant circuit is prevented from rapidly increasing to reduce stress exerted on circuit components.

When the electrical breakdown mode is shifted to the high frequency preheat mode by lowering the switching frequency in stages, the charging current to the capacitor forming the LC resonant circuit is prevented from rapidly increasing to reduce stress exerted on the circuit components.

When the control circuit lowers the switching frequency in stages in switching of the operation mode, the switching frequency is lowered to the second switching frequency in stages through one or more intermediate frequencies which are lower than the first switching frequency and higher than the second switching frequency and are equal to 1/(n) of the resonant frequency, and when the high pressure discharge lamp fades out immediately after mode switching when fade-out is easy to occur, by performing the switching operation at the intermediate frequencies closer to the resonant frequency than the second switching frequency, the voltage generated through LC resonant can be increased and the high pressure discharge lamp can be lit after fade-out again more easily. Thus, the starting ability of the lamp can be further improved.

BRIEF DESCRIPTION OF THE SEVERAL VIEWS OF THE DRAWINGS

FIG. 2(a) is a graphical view showing circuits with no load and FIG. 2(b) is a graphical view showing circuits with a load.

FIG. 6(a) and FIG. 6(b) show relationship between the operating frequency of the starting circuit and the frequency characteristics of the resonant circuit in the embodiment of FIG. 5. FIG. 6(a) is a graphical view showing circuits with no load and FIG. 6(b) is a graphical view showing circuits with a load.

DETAILED DESCRIPTION OF THE INVENTION

Figure 1:
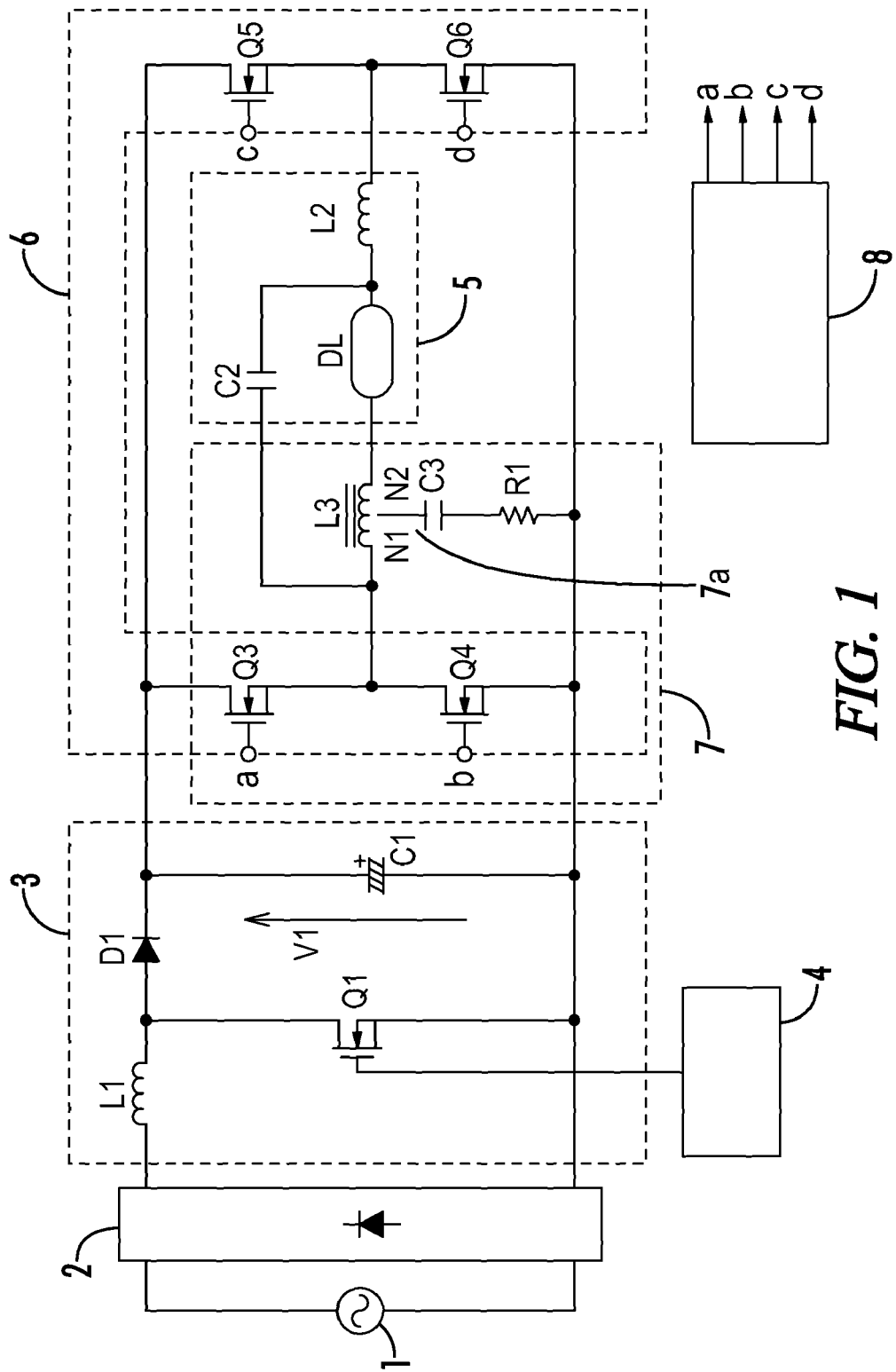
FIG. 1 is a block circuit diagram of an electronic ballast in accordance with a first embodiment.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa. Where an operating frequency of ballast switching elements is referred to as $1/(n)$ of a resonant frequency at no load, the "n" may mean any odd whole number unless otherwise stated, where for example an operating frequency of the present invention typically may be $1/3$, $1/7$, $1/11$, etc. of the resonant frequency.

Various embodiments of an electronic ballast for powering a high-pressure discharge lamp and having multi-mode starting circuitry are herein provided.

An embodiment of the present invention will be described referring generally to FIGS. 1-5. An electronic ballast in this embodiment includes, as shown in a block circuit diagram of FIG. 1, a rectifier circuit 2 formed of a diode bridge for full-wave rectifying of a commercial AC power source 1, a DC chopper circuit 3 for smoothing an output of the rectifier circuit 2, and a chopper control circuit 4 for controlling an output of the DC chopper circuit 3. The rectifier circuit 2, DC chopper circuit 3 and chopper control circuit 4 may collectively be referred to as a power supply circuit for the ballast.

The ballast of the present embodiment further includes a load circuit 5 including a high pressure discharge lamp DL such as an HID lamp, an inverter circuit 6 for converting a DC output of the DC chopper circuit 3 into a rectangular wave AC power and supplying the AC power to the load circuit 5, a starting circuit 7 for generating a starting voltage for producing electrical breakdown of the high pressure discharge lamp DL by switching a DC output of the DC chopper circuit 3, and an inverter control circuit 8 for controlling switching operations of the inverter circuit 6 and the starting circuit 7.

The DC chopper circuit 3 in the example shown is formed of a step-up type chopper circuit and includes an inductor L1, one end of which is connected to a high-pressure side output end of the rectifier circuit 2, a switching element Q1 formed of a MOS field effect transistor (MOSFET), drain-source of which is connected between the other end of the inductor L1 and a low-pressure side output end of the rectifier circuit 2, a diode D1 having an anode connected to the other end of the inductor L1, and an electrolytic capacitor C1 connected between a cathode of the diode D1 and the low-pressure side output end of the rectifier circuit 2.

The chopper control circuit 4 detects an output voltage V1 (voltage across the electrolytic capacitor C1) of the DC chopper circuit 3 and controls the output voltage V1 to a desired voltage value by controlling the switching frequency and the duty ratio of the switching element Q1.

The inverter circuit 6 includes a full bridge circuit having a series circuit formed of switching elements Q3, Q4 connected in parallel with the capacitor C1 of the DC chopper circuit 3 and further connected in parallel with another series circuit formed of switching elements Q5, Q6, and an inductor L3 with an auto-transformer structure. The high pressure discharge lamp DL and an inductor L2 are serially connected between a connection point between the switching elements Q3, Q4 and a connection point between the switching elements Q5, Q6, and also a capacitor C2 is connected in parallel with the series circuit formed of the inductor L3 and the high pressure discharge lamp DL. Here, an LC resonant circuit formed of the inductor L2 and the capacitor C2 and the high pressure discharge lamp DL form the load circuit 5.

The starting circuit 7 includes a pair of switching elements Q3, Q4 and a pair of switching elements Q5, Q6 in the inverter circuit 6 connected between the output ends of the DC chopper circuit 3, the inductor L3 and a series circuit formed of a capacitor C3 and a resistor R1 which are connected between both ends of a primary winding (shunt winding) N1 of the inductor L3 through the switching element Q4, and a series winding N2 of the inductor L3 is connected to the high pressure discharge lamp DL. The primary winding N1 of the inductor L3 and the capacitor C3 form an LC resonant circuit 7a.

The inverter control circuit 8 may be formed of for example a microprocessor, and controls an on/off position for each of the switching elements Q3 to Q6 depending on the load state. For example, in stable lighting (rectangular wave lighting mode TM3) of the discharge lamp DL, the inverter control circuit 8 alternates a first period (period T22 in FIG. 3(a)) for turning on/off the pair of switching elements Q3, Q6 in the state where the pair of switching elements Q4, Q5 located at diagonal positions are turned off and a second period (period T21 in FIG. 3(a)) for turning on/off the pair of switching elements Q4, Q5 in the state where the pair of switching elements Q3, Q6 are turned off at a relatively low frequency. The switching element Q6 is turned on/off at a relatively high frequency in the state where the switching element Q3 is turned on during the first period T22, and the switching element Q5 is turned on/off at a relatively high frequency in the state where the switching element Q4 is turned on during the second period T21.

Figures 3A, 3B:
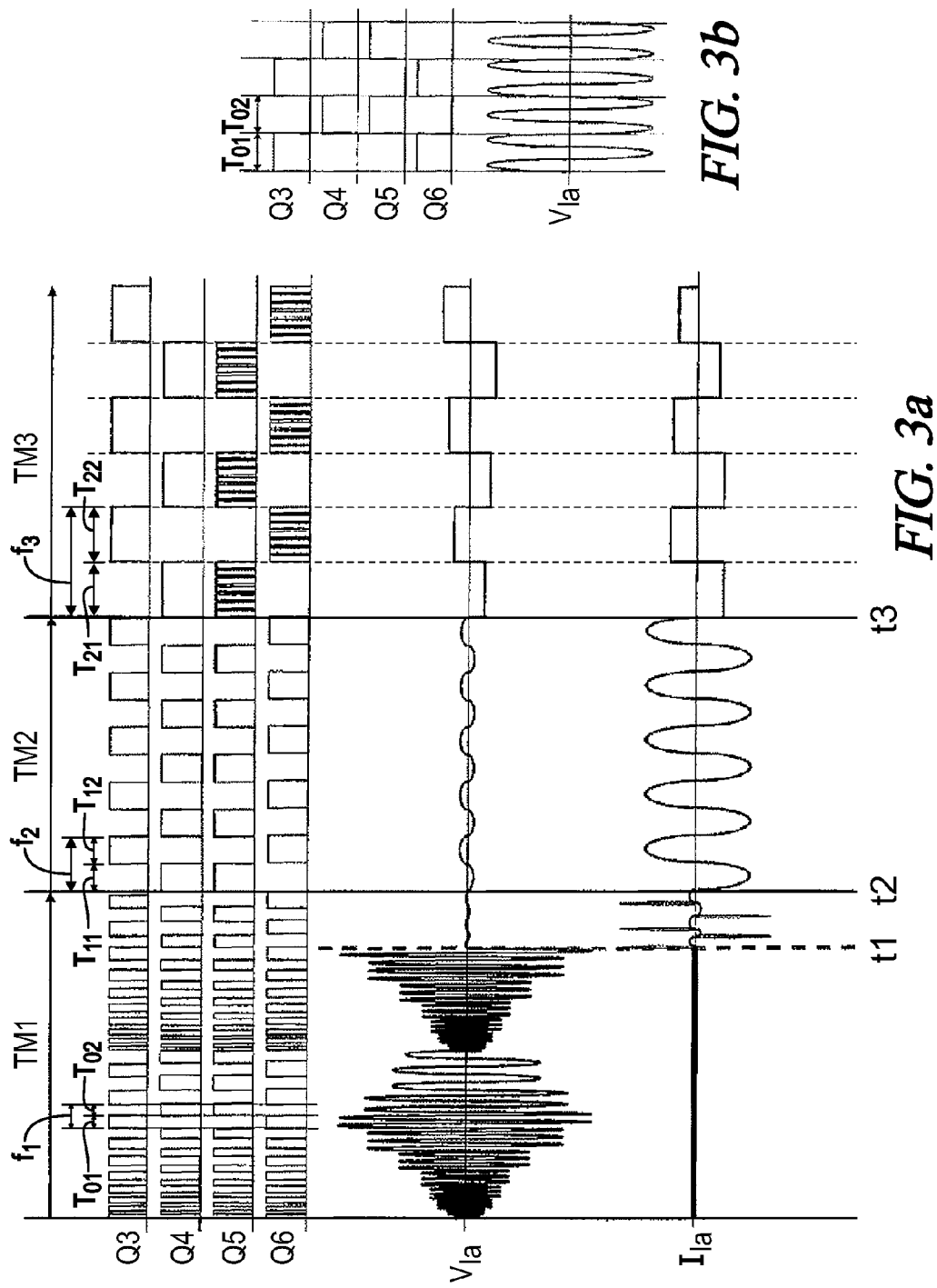
FIG. 3(a) is a waveform chart showing shifts from an electrical breakdown mode to a rectangular wave lighting mode.
FIG. 3(b) is a waveform chart highlighting the period Ta as shown in FIG. 3(a).

Next, an operation of shifting the high pressure discharge lamp DL from an unlit state to a steady-state lighting mode by the electronic ballast will be described referring to FIGS. 3(a) and 3(b). FIG. 3(a) is a waveform chart across the entire period when the discharge lamp DL shifts from an unlit state to steady-state operation (rectangular wave lighting mode TM3) and FIG. 3(b) shows a relationship between switching operation and a lamp voltage Vla during a period Ta in electrical breakdown mode TM1.

When a light switch (not shown) or equivalent starting device in the high pressure discharge lamp DL is turned on in the unlit state, the chopper control circuit 4 and the inverter control circuit 8 start a control operation. The chopper control circuit 4 controls the switching element Q1 to be turned on and off, whereby the DC chopper circuit 3 performs a chopper operation and outputs a DC voltage of a desired voltage value obtained by raising an input voltage.

The inverter control circuit 8 starts its operation in the electrical breakdown mode TM1 as shown in FIG. 3(a) and resonates the LC resonant circuit 7a by alternately providing a period T01 when the pair of switching elements Q3, Q6 are turned on and the pair of switching elements Q4, Q5 are turned off and a period T02 when the pair of switching elements Q3, Q6 are turned off and the pair of switching elements Q4, Q5 are turned on around a first switching frequency f1 of a few hundred kHz as $1/(n)$ of a resonant frequency f0 of the LC resonant circuit 7a.

Figure 2A:
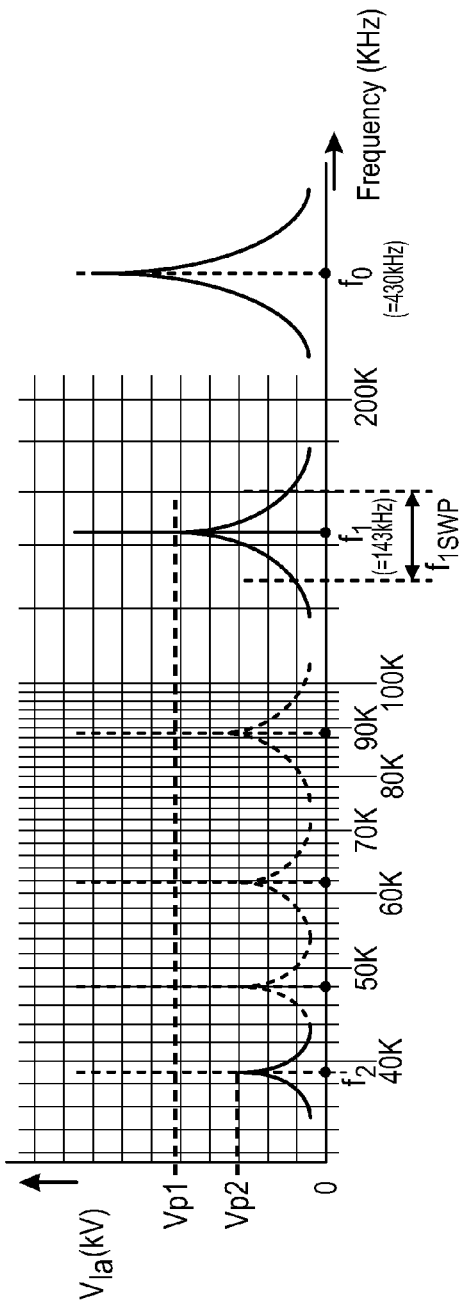
FIG. 2(a) and FIG. 2(b) show relationships between an operating frequency of a starting circuit and frequency characteristics of a resonant circuit in the embodiment of FIG. 1.

A voltage obtained by increasing a resonant voltage Vres occurring in the primary winding N1 of the inductor L3 by a winding ratio of the primary winding (shunt winding) N1 to the series winding N2 is applied between electrodes of the high pressure discharge lamp DL to generate electrical breakdown. Here, FIG. 2(a) shows a relationship between frequency characteristics and operating frequency of the LC resonant circuit 7a with no load (an unlit state of the high pressure discharge lamp DL). In this embodiment, the resonant frequency f0 of the LC resonant circuit 7a is about 430 kHz.

Generally, in the electrical breakdown mode TM1, the inverter control circuit 8 sweeps the operating frequency for alternately turning on the pair of switching elements Q3, Q6 and the pair of switching elements Q4, Q5 through a predetermined frequency range $f1_{swp}$ (for example, 96 kHz to 160 kHZ) located around the first switching frequency f1 (about 143 kHz) as 1/(n) (for example, one third) of the resonant frequency f0.

In response to the sweep of the operating frequency, a magnitude of the lamp voltage Vla applied between both ends of the high pressure discharge lamp DL changes due to the resonance effect of the LC resonant circuit 7a. As the operating frequency becomes closer to the first switching frequency f1 (about 143 kHz) as 1/(n) of the resonant frequency f0, the lamp voltage Vla is increased and a starting voltage Vp1 necessary for producing electrical breakdown of the high pressure discharge lamp DL can be applied, thereby producing electrical breakdown of the lamp DL (at time t1 as shown in FIG. 3(a)). The inverter control circuit 8 may set the first switching frequency f1 in the electrical breakdown mode TM1 to the resonant frequency f0 or the frequency of 1/(n) of the resonant frequency f0. A high resonant voltage is applied to the high pressure discharge lamp DL due to the resonance effect of the LC resonant circuit 7a, thereby capable of producing electrical breakdown of the lamp DL.

When electrical breakdown of the high pressure discharge lamp DL occurs in the above-mentioned electrical breakdown mode TM1, electric glow discharge is generated in the lamp DL and an arc discharge occurs. Operation then enters at time t2 a high frequency preheat mode TM2 as shown in FIG. 3(a) and in which a preheat current is supplied to lamp electrodes on both sides to rapidly heat the electrodes.

Figure 2B:
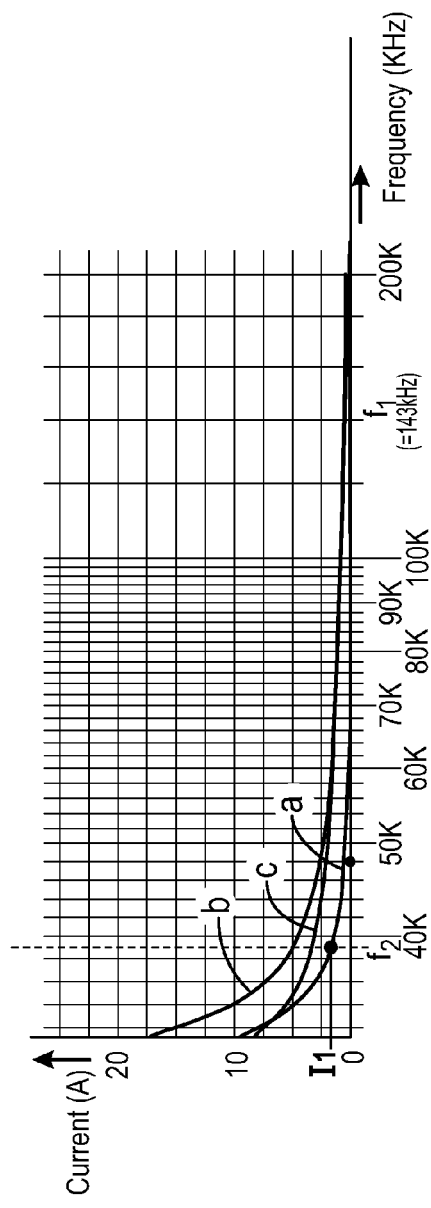

FIG. 2(b) shows frequency characteristics of a lamp current Ila upon startup of the lamp DL (in the high frequency preheat mode) (designated as curve (a) in the figure), a capacitor current Ic2 flowing through the capacitor C2 (designated as curve (b) in the figure) and a choke current Ichoke flowing through the chokes L2, L3 (designated as curve (c) in the figure). A constant of each circuit component is set so that a lamp current I1 flowing to the lamp DL within the impedance of the inductors L2, L3, the capacitor C3 and the high pressure discharge lamp DL at a second switching frequency f2 described later may have a desired current value (that is, a current value necessary for preheating the lamp electrodes).

In the high frequency preheat mode TM2, the inverter control circuit 8 alternates a period T11 when the pair of switching elements Q3, Q6 are turned off and the pair of switching elements Q4, Q5 are turned on and a period T12 when the pair of switching elements Q3, Q6 are turned on and the pair of switching elements Q4, Q5 are turned off at the second switching frequency f2 (about 39 kHz) which is lower than the first switching frequency f1 and is equal to 1/(n) of the resonant frequency f0 (one eleventh in this embodiment). Lamp current I1 is supplied to both the lamp electrodes of the lamp DL to heat both the lamp electrodes. The second switching frequency f2 in the high frequency preheat mode TM2 may include a frequency band greater than but near to frequency characteristics of the LC resonant circuit and the load circuit with the high pressure discharge lamp in a lit condition.

When both the lamp electrodes of the high pressure discharge lamp DL are fully preheated in the high frequency preheat mode TM2, the inverter control circuit 8 switches over from the high frequency preheat mode TM2 to the rectangular wave lighting mode TM3 at a time t3 as shown in FIG. 3(a). In the rectangular wave lighting mode TM3, the inverter control circuit 8 alternates the first period T21 when the pair of switching elements Q3, Q6 are turned on/off in the state where the pair of the switching elements Q4, Q5 located diagonally with each other are turned off and the second period T22 when the pair of switching elements Q4, Q5 are turned on/off in the state where the pair of switching elements Q3, Q6 are turned off at a relatively low frequency f3 (for example, a few dozens of Hz to a few hundred of Hz).

By turning on/off the switching element Q6 in the state where the switching element Q3 is turned on at a relatively high frequency in the first period T21 and turning on/off the switching element Q5 in the state where the switching element Q4 is turned on at a relatively high frequency in the second period T22, a rectangular wave AC voltage of a few dozens of Hz to a few hundred of Hz is applied to the high pressure discharge lamp DL. At this time, the lamp voltage is gradually increased as the temperature in a glass bulb of the high pressure discharge lamp increases, and after a lapse of a few minutes, the lamp voltage is put into a substantially uniform steady state. Because arc discharge is continuously generated in this state, the high pressure discharge lamp DL is maintained in the steady lighting state.

As described above, the inverter control circuit 8 shifts the high pressure discharge lamp DL from an unlit state to a steady lighting state by sequentially operating through the three modes: the electrical breakdown mode TM1, the high frequency preheat mode TM2, and the rectangular wave lighting mode TM3. However, depending on the state of the high pressure discharge lamp DL, the high pressure discharge lamp DL can potentially fade out during preheating in the high frequency preheat mode TM2.

Figure 4:
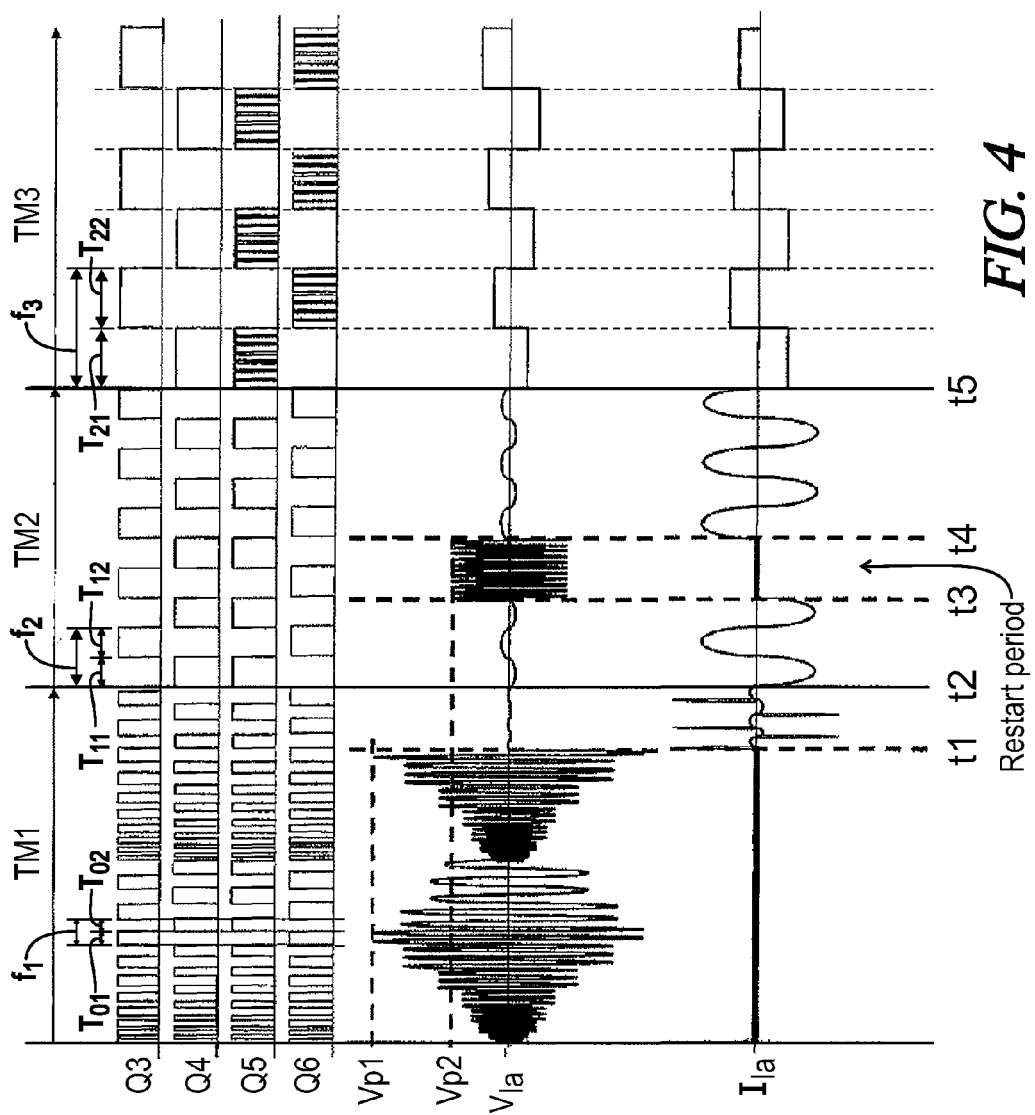
FIG. 4 is a waveform chart showing shifts from the electrical breakdown mode to the rectangular wave lighting mode in the case where fade-out occurs in the high frequency preheat mode of the embodiment of FIG. 1.

FIG. 4 is a waveform chart of each part in the case where fade-out occurs in the high frequency preheat mode. When electrical breakdown occurs at the time t1 in the electrical breakdown mode and the mode is switched from the electrical breakdown mode TM1 to the high frequency preheat mode TM2 at the time t2 and after that, fade-out occurs at the time t3 during high-frequency preheating of both the lamp electrodes of the high pressure discharge lamp DL, the inverter control circuit 8 alternates the period T11 when the pair of switching elements Q3, Q6 are turned off and the pair of switching elements Q4, Q5 are turned on and the period T12 when the pair of switching elements Q3, Q6 are turned on and the pair of switching elements Q4, Q5 are turned off at the second switching frequency f2.

When the resonant frequency of the LC resonant circuit 7a in a no-load condition is defined as f0, the second switching frequency f2 (about 39 kHz) is set to a frequency of 1/(n) (for example, one eleventh) of the resonant frequency f0. Thus, a resonant voltage Vp2 which is higher than the output voltage V1 of the DC chopper circuit 3 can be applied between the lamp electrodes of the high pressure discharge lamp DL due to resonant effect of the LC resonant circuit 7a to regenerate electrical breakdown during an electrical breakdown regeneration period, or restart period. Whereby, the lamp DL can be shifted to the high frequency preheat mode TM2 and then, to the rectangular wave lighting mode TM3 when both the lamp electrodes are sufficiently heated. As the result, the lamp DL can be lit in a stable manner.

In the high frequency preheat mode the inverter control circuit 8 in an embodiment of the present invention allows the switching elements Q3-Q6 of the starting circuit 7 to be switched at the second switching frequency f2, which is lower than the first switching frequency f1 and is equal to 1/(n) of the resonant frequency f0, to heat at high frequency both the lamp electrodes of the high pressure discharge lamp DL.

When the lamp electrodes are sufficiently heated, the operation mode is shifted to the rectangular wave lighting mode TM3 and lamp DL is lit in a stable manner. Accordingly, when fade-out occurs during preheating of the high pressure discharge lamp DL, because the switching frequency of the starting circuit 7 is set to the second switching frequency f2 as a frequency which is lower than the first switching frequency f1 and is equal to 1/(n) of the resonant frequency f0 in a no-load condition in the high frequency preheat mode, the resonant voltage which is higher than the output voltage of the DC chopper circuit can be applied to the lamp DL due to the resonance effect of the LC resonant circuit 7a, and electrical breakdown of the high pressure discharge lamp DL can be produced again to return to the high frequency preheat mode. Therefore, it is possible to provide a high-pressure electronic ballast with fewer startup failures.

Figure 5:
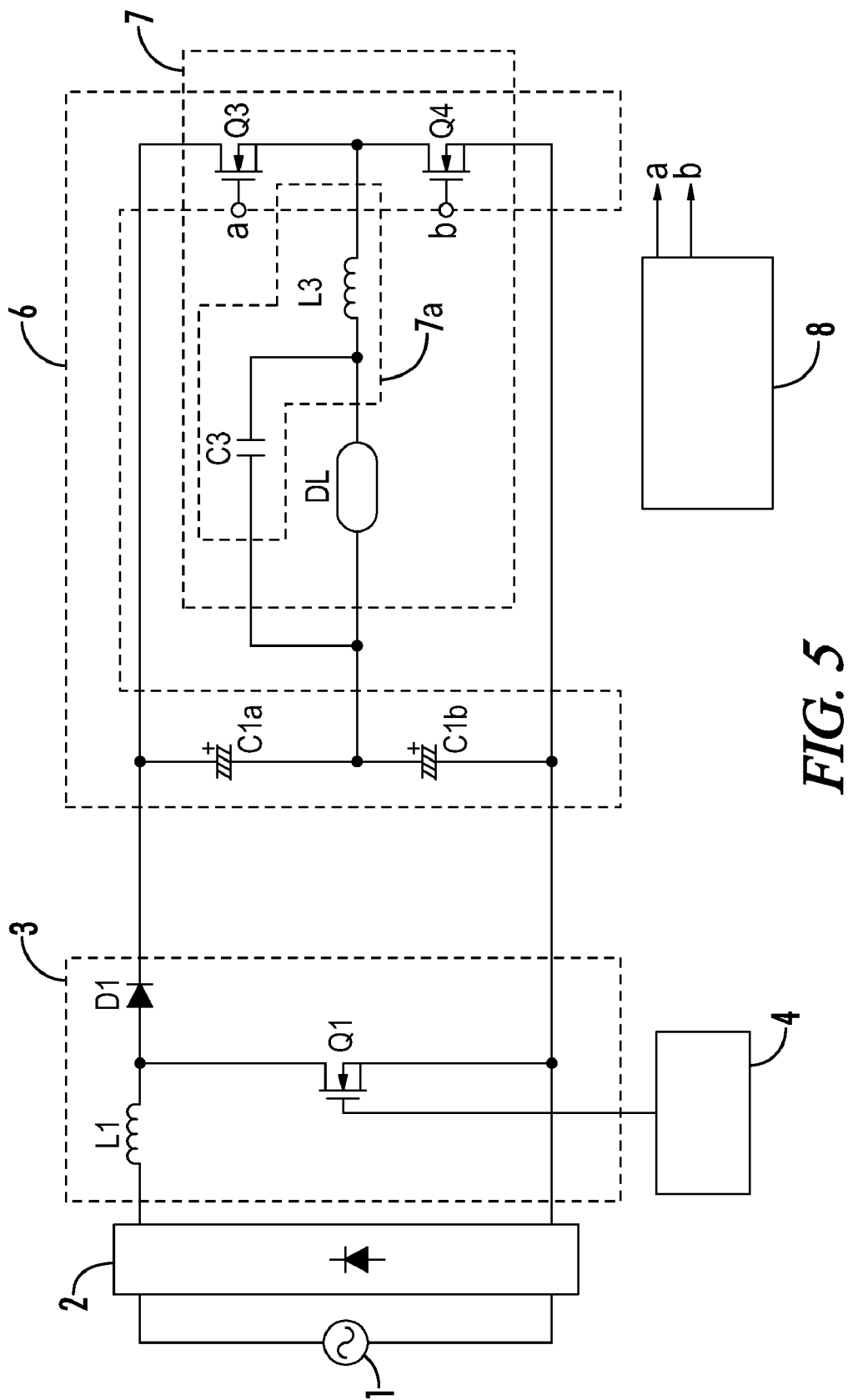
FIG. 5 is a block circuit diagram showing an electronic ballast of another embodiment of the present invention.

Although the inverter circuit 6 is formed of the full-bridge circuit in this embodiment, in alternative embodiments the inverter circuit 6 may have a half-bridge structure as shown in FIG. 5. In this embodiment, two electrolytic capacitors C1a, C1b are serially connected between output terminals of the DC chopper circuit 3 and a series circuit formed of the switching elements Q3, Q4 is connected in parallel with the capacitors C1a, C1b. The LC resonant circuit 7a as the series circuit formed of the capacitor C3 and the inductor L3 is connected between a connection point of the capacitors C1a, C1b and a connection point of the switching elements Q3, Q4. The high pressure discharge lamp DL is connected to the capacitor C3 in parallel. Here, the switching elements Q3, Q4 and the capacitors C1a, C1b form the inverter circuit 6 and the switching elements Q3, Q4 and the LC resonant circuit 7a formed of the capacitor C3 and the inductor L3 form the starting circuit 7.

Also in the electronic ballast shown in FIG. 5, the inverter control circuit 8 lights the high pressure discharge lamp DL by sequentially operating through the three modes: the electrical breakdown mode, the high frequency preheat mode and the rectangular wave lighting mode. By alternately turning on the switching elements Q3, Q4 around the first switching frequency f1 (the above-mentioned frequency range $f1_{swp}$) as a frequency corresponding to 1/(n) of the resonant frequency f0 of the LC resonant circuit 7a in the electrical breakdown mode TM1, the inverter control circuit 8 generates the starting voltage for producing electrical breakdown of the high pressure discharge lamp DL.

In the high frequency preheat mode TM2, the inverter control circuit 8 supplies a high frequency voltage generated by alternately turning on the switching elements Q3, Q4 at the second switching frequency f2 which is lower than the first switching frequency f1 and is equal to 1/(n) of the resonant frequency f0 to both the lamp electrodes of the high pressure discharge lamp DL to preheat the lamp electrodes. In the subsequent rectangular wave lighting mode TM3, the inverter control circuit 8 alternates on/off switching of the switching element Q3 and on/off switching of the switching element Q4 at a relatively low frequency of a few dozens of Hz to a few hundreds of Hz, and supplies a relatively low frequency rectangular wave AC voltage to the high pressure discharge lamp DL, thereby lighting the lamp DL in a stable manner.

Also in this embodiment of an electronic ballast, similarly to the above-mentioned embodiments of the electronic ballast having the inverter circuit 6 with full-bridge structure, when the high pressure discharge lamp DL fades out in the high frequency preheat mode TM2, the switching elements Q3, Q4 are switched at the second switching frequency f2 which is lower than the first switching frequency f1 and is equal to 1/(n) of the resonant frequency f0 in a no-load condition. Accordingly, the resonant voltage which is higher than the output voltage of the DC chopper circuit 3 can be applied to the high pressure discharge lamp DL due to the resonance effect of the LC resonant circuit 7a and electrical breakdown of the high pressure discharge lamp DL can be produced, thereby returning operation to the high frequency preheat mode TM2. Therefore, it is possible to decrease startup failures and improve the starting ability of the ballast.

Another embodiment of the present invention will be described referring to FIGS. 6-7. Because the circuit structure of the electronic ballast in this embodiment is substantially the same as that shown in FIG. 1, further illustration and description thereof are omitted.

Operation of the discharge lamp DL in shifting from the unlit state to the steady lighting state in this embodiment will be described referring to FIG. 7. Because operation in the electrical breakdown mode and the rectangular wave lighting mode is substantially the same as that previously described in this section, further description thereof is omitted.

When electrical breakdown of the high pressure discharge lamp DL occurs at a time t1 in the electrical breakdown mode TM1, electric glow discharge is generated in the high pressure discharge lamp DL and arc discharge begins. Thereafter, the inverter control circuit 8 switches operation from the electrical breakdown mode TM1 to the high frequency preheat mode TM2 at a time t2. FIG. 6(b) shows frequency characteristics of the lamp current (designated as (a) in the figure), the capacitor current flowing through the capacitor C2 (designated as (b) in the figure) and the choke current flowing through the chokes L2, L3 (designated as (c) in the figure) upon startup of the high pressure discharge lamp DL (in the high frequency preheat mode TM2). A constant of each circuit component is set so that a lamp current Ila (I2≦Ila≦I3) in the case where the switching frequency is swept at a frequency range $f2_{swp}$ described later may have a desired current value (that is, current value necessary for preheating the lamp electrodes).

In the high frequency preheat mode TM2, the inverter control circuit 8 sweeps the operating frequency for alternately turning on the pair of switching elements Q3, Q6 and the pair of switching elements Q4, Q5 through a predetermined frequency range $f2_{swp}$ around and including the second switching frequency f2 (about 39 kHz) as a frequency which is lower than the first switching frequency f1 and is equal to 1/(n) (one eleventh in this embodiment) of the resonant frequency f0. Because the lamp current Ila flowing to the high pressure discharge lamp DL changes between a lamp current I2 at a maximum frequency in the frequency range $f2_{swp}$ and a lamp current I3 at a minimum frequency in the frequency range $f2_{swp}$ according to the sweeping control of the operating frequency (I2≦Ila≦I3), a sufficient lamp current Ila for preheating is supplied to both the lamp electrodes. The frequency range $f2_{swp}$ including the second switching frequency f2 may include a frequency band greater than but near to frequency characteristics of the LC resonant circuit and the load circuit with the high pressure discharge lamp in a lit condition.

Figure 7:
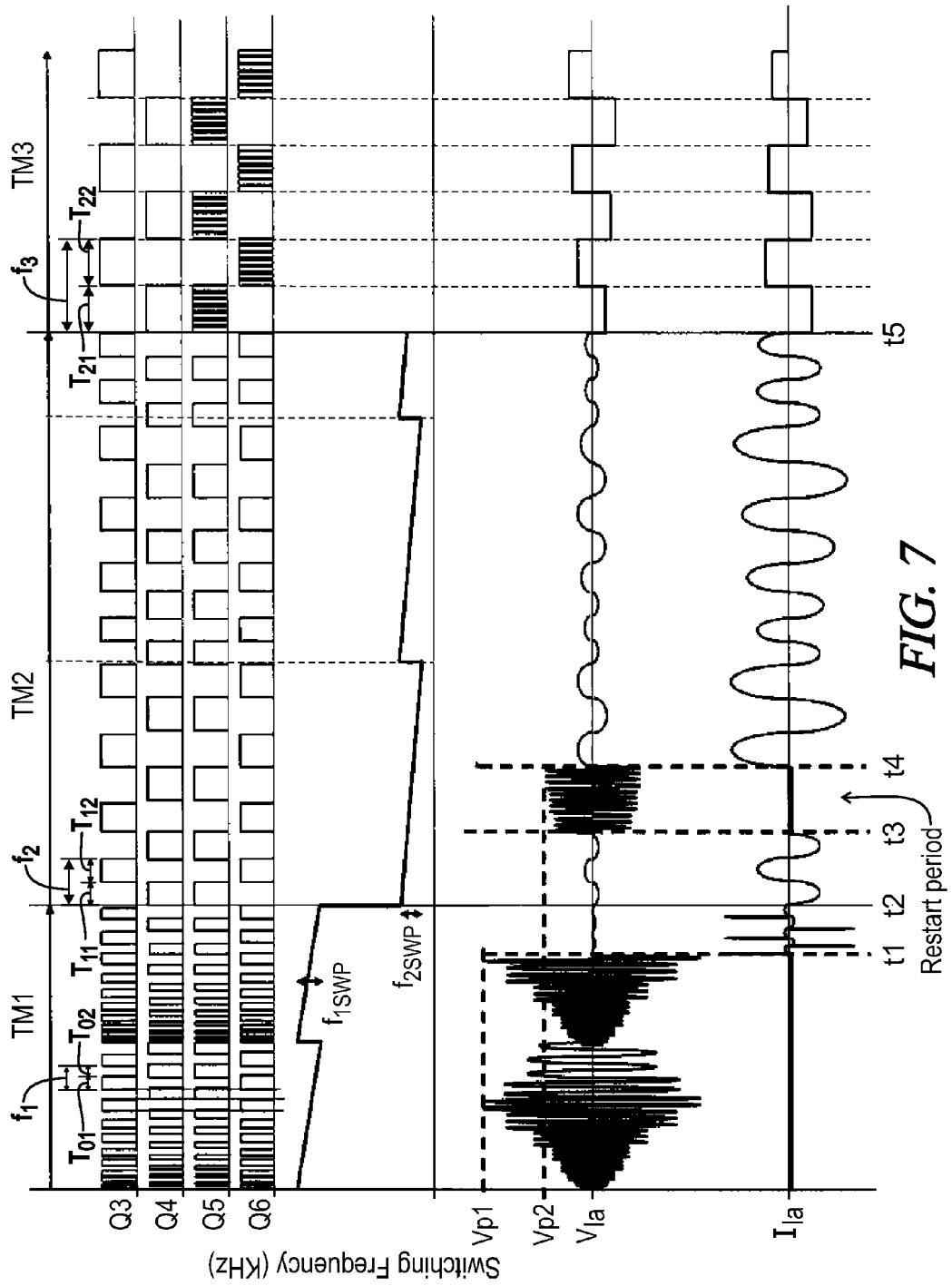
FIG. 7 is a waveform chart showing shifts from the electrical breakdown mode to the rectangular wave lighting mode.

When both the lamp electrodes of lamp DL are equally preheated in the high frequency preheat mode, the inverter control circuit 8 switches operation from the high frequency preheat mode to the rectangular wave lighting mode at a time t5 in FIG. 7 and thus, the lamp DL can be lit in a stable manner.

As described with reference to the above embodiment, by performing the three operation modes: the electrical breakdown mode, the high frequency preheat mode and the rectangular wave lighting mode in series, the inverter control circuit 8 shifts the high pressure discharge lamp DL from an unlit state into a steady lighting state. However, the discharge lamp DL during preheating in the high frequency preheat mode can fade out depending on the state of the high pressure discharge lamp DL.

When the lamp DL of the present embodiment fades out at a time t3 in the high frequency preheat mode TM2, the inverter control circuit 8 sweeps the operating frequency for alternately turning on the pair of switching elements Q3, Q6 and the pair of switching elements Q4, Q5 in the above-mentioned frequency range $f2_{swp}$. Accordingly, when the operating frequency gets close to the second switching frequency f2 (for example, 39 kHz) as a frequency of 1/(n) (or for example one eleventh) of the resonant frequency f0 (for example, 430 kHz), the resonant voltage Vp2 which is higher than the output voltage V1 of the DC chopper circuit 3 can be applied between the lamp electrodes due to the resonant effect of the LC resonant circuit 7a. Thus, even if fade-out occurs during preheating, electrical breakdown is easy to obtain again by applying the resonant voltage between the electrodes of the high pressure discharge lamp DL. By shifting the operation mode to the high frequency preheat mode after occurrence of electrical breakdown and then to the rectangular wave lighting mode when both the lamp electrodes are sufficiently heated, the high pressure discharge lamp DL can be lit in a stable manner. Therefore, it is possible to provide the electronic ballast with fewer startup failures and improved starting ability.

The electronic ballast in FIG. 5 and as described with respect to previous embodiments may be controlled as in this embodiment and the above-mentioned effect can thereby be obtained.

Figure 8:
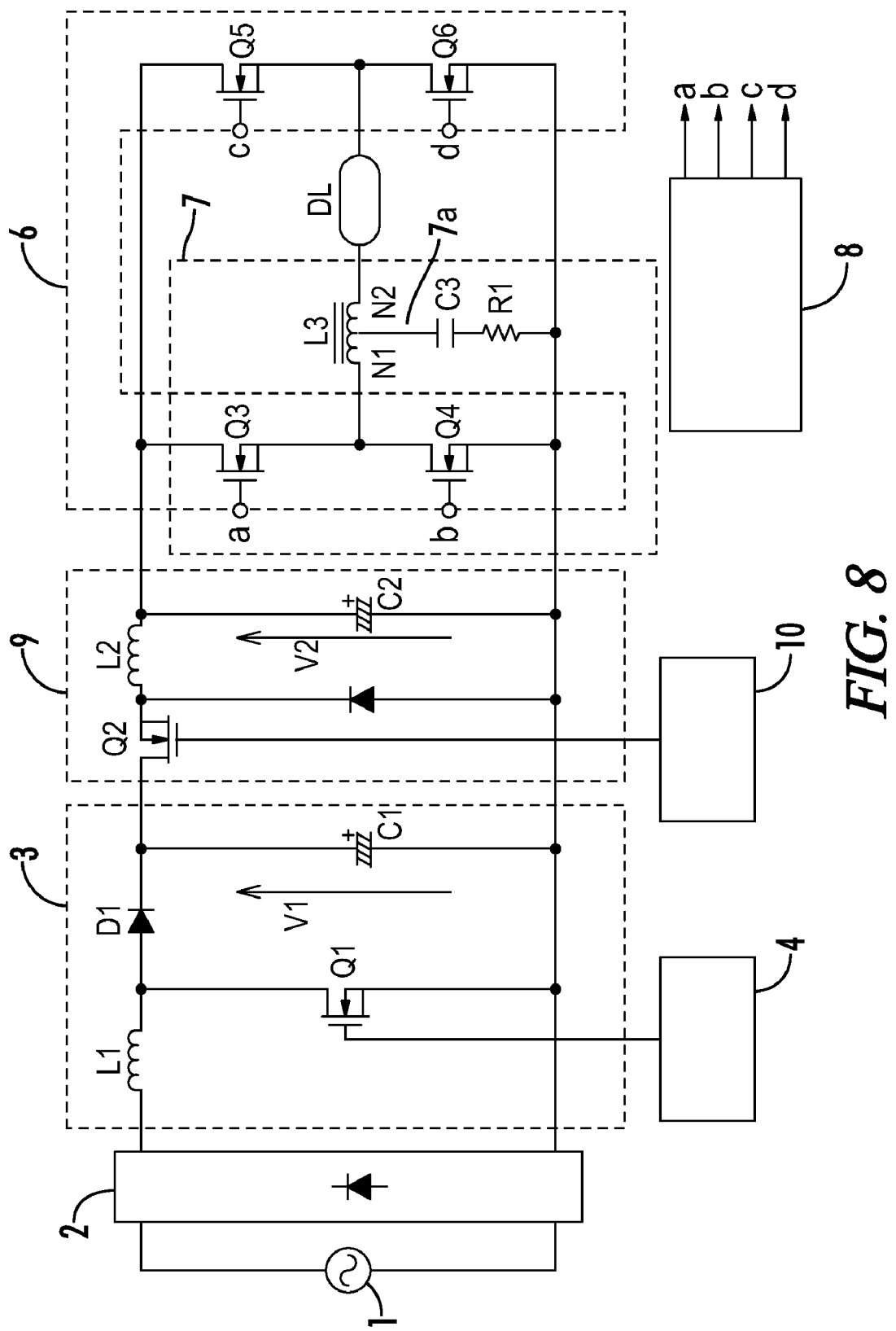
FIG. 8 is a block circuit diagram of an electronic ballast in accordance with another embodiment of the present invention.

Another embodiment of the ballast of the present invention will now be described referring to FIG. 8 and FIG. 9. A electronic ballast as shown in the block circuit diagram of FIG. 8 includes a power supply circuit having a rectifier circuit 2 formed of a diode bridge for full-wave rectification of a commercial AC power source 1, a DC chopper circuit 3 formed of a step-up chopper for smoothing the output of the rectifier circuit 2, a step-up chopper control circuit 4 for controlling an output of the DC chopper circuit 3, a step-down chopper circuit 9 for controlling a lighting power of the DL by lowering the output voltage of the DC chopper circuit 3 to a desired voltage value, and a step-down chopper control circuit 10 for controlling an output of the step-down chopper circuit 9.

The ballast of the embodiment as shown further includes an inverter circuit 6 for converting the DC output of the step-down chopper circuit 9 into a rectangular wave AC power and supplying the AC power to the high pressure discharge lamp DL, a starting circuit 7 for generating the starting voltage producing electrical breakdown of the lamp DL by switching the DC output of the step-down chopper circuit 9 and an inverter control circuit 8 for controlling switching operation of the inverter circuit 6 and the starting circuit 7.

The DC chopper circuit 3 includes a step-up type chopper circuit and an inductor L1, one end of which is connected to the high output end of the rectifier circuit 2, the switching element Q1 formed of the MOS-type field effect transistor (MOSFET), drain-source of which is connected between the other end of the inductor L1 and the low-pressure side output end of the rectifier circuit 2, the diode D1, the anode of which is connected to the other end of the inductor L1 and the capacitor C1 connected between the cathode of the diode D1 and the low output end of the rectifier circuit 2.

The step-up chopper control circuit 4 detects the output voltage V1 (voltage between both ends of the capacitor C1) of the DC chopper circuit 3 and controls the output voltage V1 to a desired voltage value by controlling the switching frequency and a duty ratio of the switching element Q1.

The step-down chopper circuit 9 includes a series circuit formed of a switching element Q2 as a MOSFET connected to the high side output end of the DC chopper circuit 3 and the inductor L2, a diode D2 connected between the output ends of the DC chopper circuit 3 through the switching element Q2 and a capacitor C2 connected between the other end of the inductor L2 and the low-side output end of the DC chopper circuit 3, and a voltage between both ends V2 of the capacitor C2 is supplied to the inverter circuit 6.

The step-down chopper control circuit 10 changes the output voltage V2 of the step-down chopper circuit 9 by turning on/off the switching element Q2 of the step-down chopper circuit 9 according to a control signal provided from the inverter control circuit 8 to control lighting power to the high pressure discharge lamp DL.

The inverter circuit 6 includes a full-bridge circuit having a series circuit formed of switching elements Q3, Q4 and a series circuit formed of switching elements Q5, Q6, each of which is connected between output ends of the step-down chopper circuit 9 (that is, between both ends of the capacitor C2), and the inductor L3 with auto-transformer (single-turn transformer) structure and the high pressure discharge lamp DL are connected in series between the connection point of the switching elements Q3, Q4 and the connection point of the switching elements Q5, Q6.

The starting circuit 7 includes the pair of switching elements Q3, Q4 and the pair of switching elements Q5, Q6 in the inverter circuit 6 connected to both output ends of the DC chopper circuit 3, the inductor L3, and the series circuit which is formed of the capacitor C3 and the resistor R1 connected both ends of the primary winding (shunt winding) N1 of the inductor L3 through the switching element Q4, and the series winding N2 of the inductor L3 is connected to the high pressure discharge lamp DL. The primary winding N1 of the inductor L3 and the capacitor C3 form the LC resonant circuit 7a.

The inverter control circuit 8 is formed of, for example, a microprocessor and controls the switching element Q2 of the step-down chopper circuit 9 and the switching elements Q3 to Q6 of the inverter circuit 6 to turn on and off depending on the load state. For example, in steady-state lighting (in the rectangular wave lighting mode TM3) of the lamp DL, the inverter control circuit 8 alternates the first period T21 when the pair of switching elements Q3, Q6 are turned on/off in the state where the pair of switching elements Q4, Q5 located diagonally with each other are turned off and the second period T22 when the pair of switching elements Q4, Q5 are turned on/off in the state where the pair of switching elements Q3, Q6 are turned off at a relatively low frequency.

Operation of the lamp DL shifting from an unlit state to the steady lighting state by the electronic ballast will be described referring to FIG. 9 and FIG. 10. FIG. 10 is a waveform chart of each part of the lamp DL shifting from an unlit state to the steady lighting state.

First, a light switch or equivalent starting device (not shown) of the lamp DL is turned on in the unlit state, and the chopper control circuit 4 and the inverter control circuit 8 start their control operations. The chopper control circuit 4 controls the switching element Q1 to turn on and off, thereby allowing the DC chopper circuit 3 to perform a chopper operation and output a DC voltage having a predetermined voltage value obtained by raising the input current. Using the step-down chopper control circuit 10, the inverter control circuit 8 controls the switching element Q2 to turn on and off and outputs a DC voltage having a predetermined voltage value obtained by lowering the output voltage of the DC chopper circuit 3.

The inverter control circuit 8 first starts its operation in the electrical breakdown mode TM1 as shown in FIG. 10, and controls the switching element Q2 to turn on and off and output the DC voltage having a predetermined voltage value obtained by lowering the output voltage of the DC chopper circuit 3 by using the step-down chopper control circuit 10. The LC resonant circuit 7a is resonated by alternately providing the period T01 when the pair of switching elements Q3, Q6 are turned on and the pair of switching elements Q4, Q5 are turned off and the period T02 when the pair of switching elements Q3, Q6 are turned off and the pair of switching elements Q4, Q5 are turned on around the first switching frequency f1 of a few dozens of kHz to a few hundred of kHz, which is equal to $1/(n)$ of the resonant frequency f0 of the LC resonant circuit 7a. At this time, a voltage obtained by raising the resonant voltage occurring in the primary winding N1 of the inductor L3 by the winding ratio of the primary winding (shunt winding) N1 to the series winding N2 is applied between the electrodes of the high pressure discharge lamp DL, thereby producing electrical breakdown.

Figure 9:
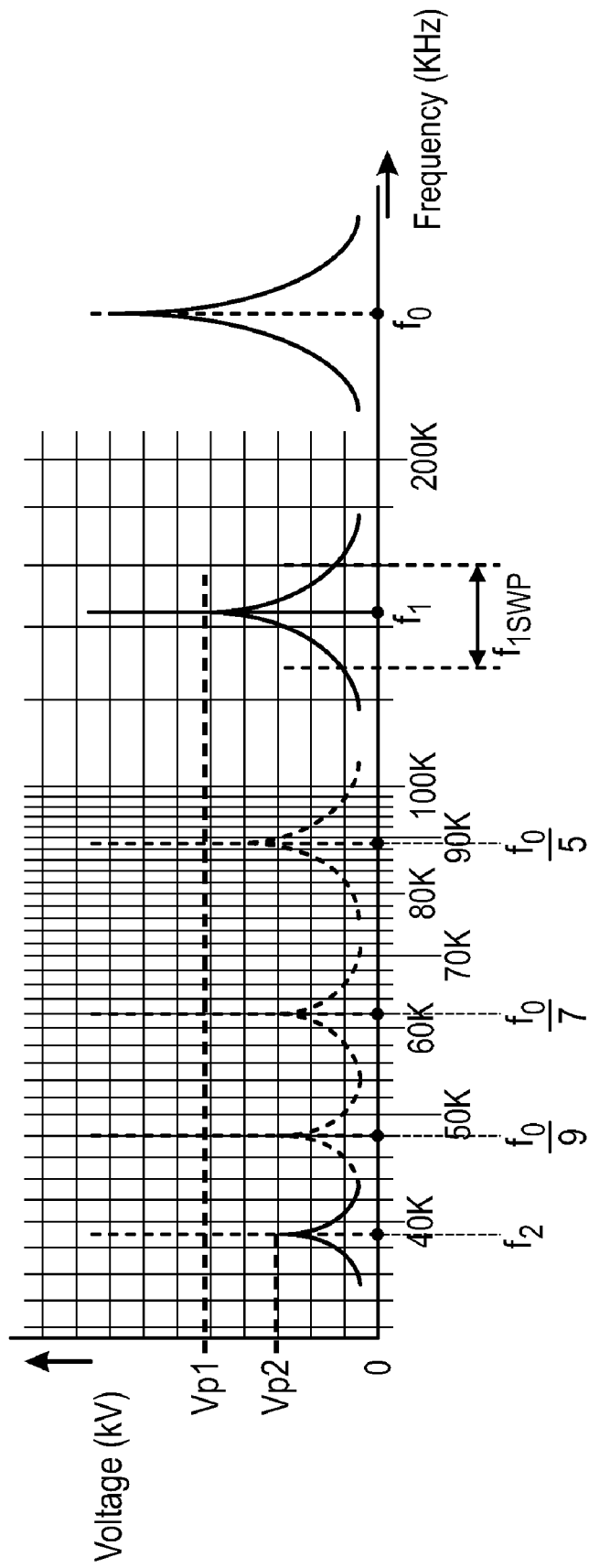
FIG. 9 is a graphical view showing relationships between frequency characteristics of the resonant circuit and the operating frequency of the starting circuit with no load in the embodiment of FIG. 8.
Figure 10:
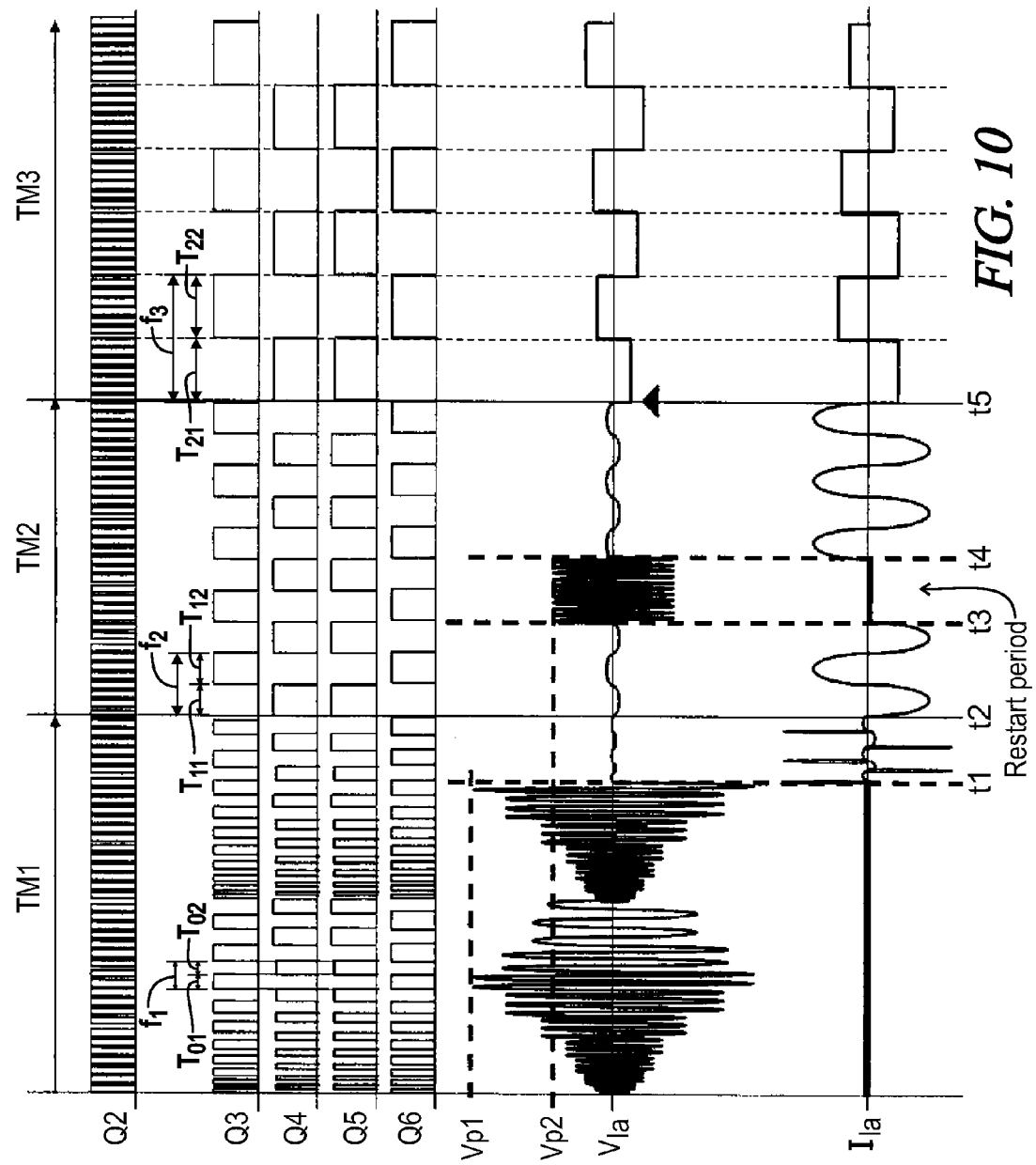
FIG. 10 is a waveform chart showing shifts from the electrical breakdown mode to the rectangular wave lighting mode in the embodiment of FIG. 8.

FIG. 9 shows a relationship between the frequency characteristics of the resonant circuit 7a and the operating frequency in a no-load condition (in the unlit state of the high pressure discharge lamp DL). In this embodiment, the resonant frequency f0 of the LC resonant circuit 7a is about 430 kHz. In the electrical breakdown mode TM1, the inverter control circuit 8 sweeps the operating frequency for alternately turning on the pair of switching elements Q3, Q6 and the pair of switching elements Q4, Q5 through the predetermined frequency range f1 swp (for example, 96 kHz to 160 kHz) around and including the first switching frequency f1 (about 143 kHz) as a frequency of $1/(n)$ (for example, one third) of the resonant frequency f0. The magnitude of the lamp voltage Vla applied between both ends of the high pressure discharge lamp DL due to the resonant effect of the LC resonant circuit 7a changes in response to the sweeping of the operating frequency. When the operating frequency corresponds to the first switching frequency f1 (about 143 kHz) as the frequency of $1/(n)$ of the resonant frequency f0, the lamp voltage Vla approaches a maximum level, and thus the starting voltage Vp1 necessary for producing electrical breakdown of the high pressure discharge lamp DL can be applied to the high pressure discharge lamp DL, thereby producing electrical breakdown of the high pressure discharge lamp DL (time t1 in FIG. 10).

In the inverter control circuit 8, the first switching frequency f1 in the electrical breakdown mode TM1 may be set to the resonant frequency f0 or the frequency of $1/(n)$ of the resonant frequency f0 and the high resonant voltage can be applied to the high pressure discharge lamp DL due to the resonance effect of the LC resonant circuit 7a, thereby capable of producing electrical breakdown of the high pressure discharge lamp DL.

When electrical breakdown of the high pressure discharge lamp DL is generated by the starting circuit 7 in the above-described electrical breakdown mode, electric glow discharge occurs in the high pressure discharge lamp DL and then arc discharge begins. The mode of supplying the preheat current to both the lamp electrodes to rapidly heat both the lamp electrodes in this period is the high frequency preheat mode TM2 as shown in FIG. 10. In the high frequency preheat mode TM2, the inverter control circuit 8 alternates the period T11 when the pair of switching elements Q3, Q6 are turned off and the pair of switching elements Q4, Q5 are turned on, and the period T12 when the pair of switching elements Q3, Q6 are turned on and the pair of switching elements Q4, Q5 are turned off, at the second switching frequency f2 (about 39 kHz) which is lower than the first switching frequency f1 and is equal to $1/(n)$ (one eleventh in this embodiment) of the resonant frequency f0. The lamp current I1 is supplied to both the lamp electrodes of the high pressure discharge lamp DL to preheat both the lamp electrodes. The second switching frequency f2 may include a frequency band greater than but near to frequency characteristics of the LC resonant circuit and the load circuit with the high pressure discharge lamp in a lit condition.

When both the lamp electrodes of the lamp DL are equally preheated in the high frequency preheat mode TM2, the inverter control circuit 8 switches from the high frequency preheat mode TM2 to the rectangular wave lighting mode TM3 at a time t5 in FIG. 10. In the rectangular wave lighting mode TM3, the inverter control circuit 8 alternately turns on/off the pair of switching elements Q4, Q5 and the pair of switching elements Q3, Q6 which are located diagonally to each other at a relatively low frequency (for example, a few dozens of Hz to a few hundreds of Hz) and applies the rectangular wave AC voltage of a few dozens of Hz to a few hundreds of Hz to the high pressure discharge lamp DL. At this time, the lamp voltage is gradually increased as the temperature in a glass bulb of the high pressure discharge lamp DL increases and after a lapse of a few minutes, the lamp voltage is put into a substantially uniform stable state. Because arc discharge is continuously generated in this state, the high pressure discharge lamp DL is kept in the steady lighting state.

As described above, although the inverter control circuit 8 shifts the high pressure discharge lamp DL from an unlit state into a steady lighting state by sequentially switching the three modes: the electrical breakdown mode, the high frequency preheat mode and the rectangular wave lighting mode, the high pressure discharge lamp DL may fade out during preheating in the high frequency preheat mode depending on the state of the high pressure discharge lamp DL.

FIG. 10 is a waveform chart of each part in the case where fade-out occurs in the high frequency preheat mode TM2. When fade-out occurs at a time t3 in the high frequency preheat mode TM2, the inverter control circuit 8 alternates the period T11 when the pair of switching elements Q3, Q6 are turned off and the pair of switching elements Q4, Q5 are turned on and the period T12 when the pair of switching elements Q3, Q6 are turned on and the pair of switching elements Q4, Q5 are turned off at the second switching frequency f2.

When the resonant frequency of the LC resonant circuit 7a in a no-load condition is defined as f0, the second switching frequency f2 (about 39 kHz) becomes the frequency of $1/(n)$ (for example, one eleventh) of the resonant frequency f0. Accordingly, the resonant voltage Vp2 which is higher than the output voltage V1 (so-called bus voltage) of the DC chopper circuit 3 can be applied between the lamp electrodes of the lamp DL due to the resonance effect of the LC resonant circuit 7a, thereby producing electrical breakdown again at time t4. Then, by shifting the high pressure discharge lamp DL to the high frequency preheat mode TM2 and then to the rectangular wave lighting mode TM3 when both the lamp electrodes are sufficiently heated at time t5, the high pressure discharge lamp DL can be lit in a stable manner.

That is, in the electronic ballast in this embodiment, even if fade-out occurs in the high frequency preheat mode, switching operation is performed at a frequency of 1/(n) of resonant frequency f0 in a no-load condition. Thus, the resonant voltage which is higher than the output voltage of the DC chopper circuit can be applied to the high pressure discharge lamp DL due to the resonant effect of the LC resonant circuit 7a and electrical breakdown of the high pressure discharge lamp DL can be produced again, thereby returning operation of the ballast to the high frequency preheat mode TM2 at time t4. Therefore, it is possible to provide the electronic ballast with less startup failure and improved starting ability.

Figure 11:
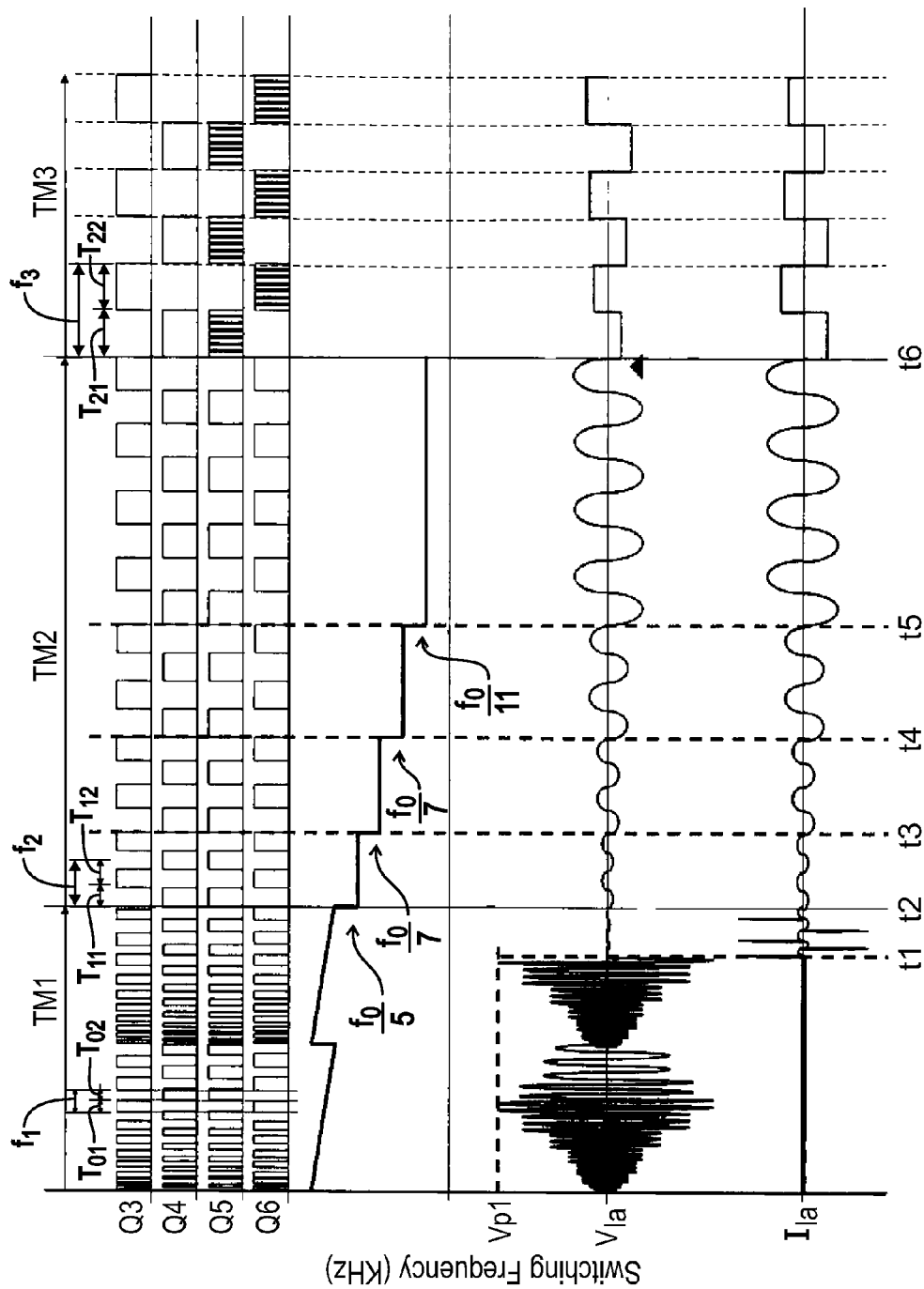
FIG. 11 is a waveform chart showing shifts from the electrical breakdown mode to the rectangular wave lighting mode for another embodiment of the present invention.

Another embodiment of the present invention will now be described with reference to FIGS. 11-14. Although the switching frequency of the starting circuit 7 is switched from the first switching frequency f1 to the second switching frequency f2 when the inverter control circuit 8 shifts from the electrical breakdown mode to the high frequency preheat mode in previously described embodiments, the switching frequency may rather be gradually switched as shown in FIG. 11. Because circuit structure of the electronic ballast in this embodiment is the same as that in FIG. 1, illustration and description thereof are omitted.

FIG. 11 is a waveform chart of each part of the high pressure discharge lamp DL shifting from an unlit state to the steady lighting state. When electrical breakdown occurs at the time t1 in the electrical breakdown mode TM1, operation is switched to the high frequency preheat mode TM2 at the subsequent time t2. The inverter control circuit 8 lowers the frequency for alternately turning on/off the pair of switching elements Q3, Q6 and the pair of switching elements Q4, Q5 to the frequency (f0/5) of one fifth of the resonant frequency f0 at a time t2, the frequency (f0/7) of one seventh of the resonant frequency f0 at a time t3 and the frequency (f0/9) of one ninth of the resonant frequency f0 at a time t4 in stages, and finally to the frequency (f0/11) of one eleventh of the resonant frequency f0. In other words, in lowering the switching frequency in stages, one or more (in this embodiment, for example, three) intermediate frequencies f015, f0/7, f0/9, which are lower than the first switching frequency f1 (=f0/3) and higher than the second switching frequency f2 (=f0/11) and are equal to 1/(n) of the resonant frequency are set and the first switching frequency f1 is lowered to the second switching frequency f2 through the three intermediate frequencies f015, f0/7, f0/9 in stages.

During the period when the high pressure discharge lamp DL is most likely to fade out immediately after operation is switched to the high frequency preheat mode TM2, switching operation is performed at the intermediate frequencies (f015, f0/7, f0/9) closer to the resonant frequency f0 than the second switching frequency. Thus, as compared to the case the switching operation is performed at the second switching frequency f2 (=f0/11) immediately after switching to the high frequency preheat mode TM2, a higher resonant voltage can be generated. When fade-out occurs in the high frequency preheat mode TM2, by applying the high resonant voltage to the high pressure discharge lamp DL, the high pressure discharge lamp DL can be lit again. In the high frequency preheat mode TM2, because the inverter control circuit 8 lowers the switching frequency in stages over time and finally switches to the desired switching frequency (f0/11), operation can be shifted by stages into the rectangular wave lighting mode TM3 where the preheat current is increased, and the lamp electrodes of the high pressure discharge lamp DL are sufficiently preheated.

In the example shown in FIG. 11, when the electrical breakdown mode TM1 is switched to the high frequency preheat mode TM2, the inverter control circuit 8 switches the switching frequency in the order of f0/5, f0/7, f0/9 and f0/11 in a stepped manner.

Figure 12:
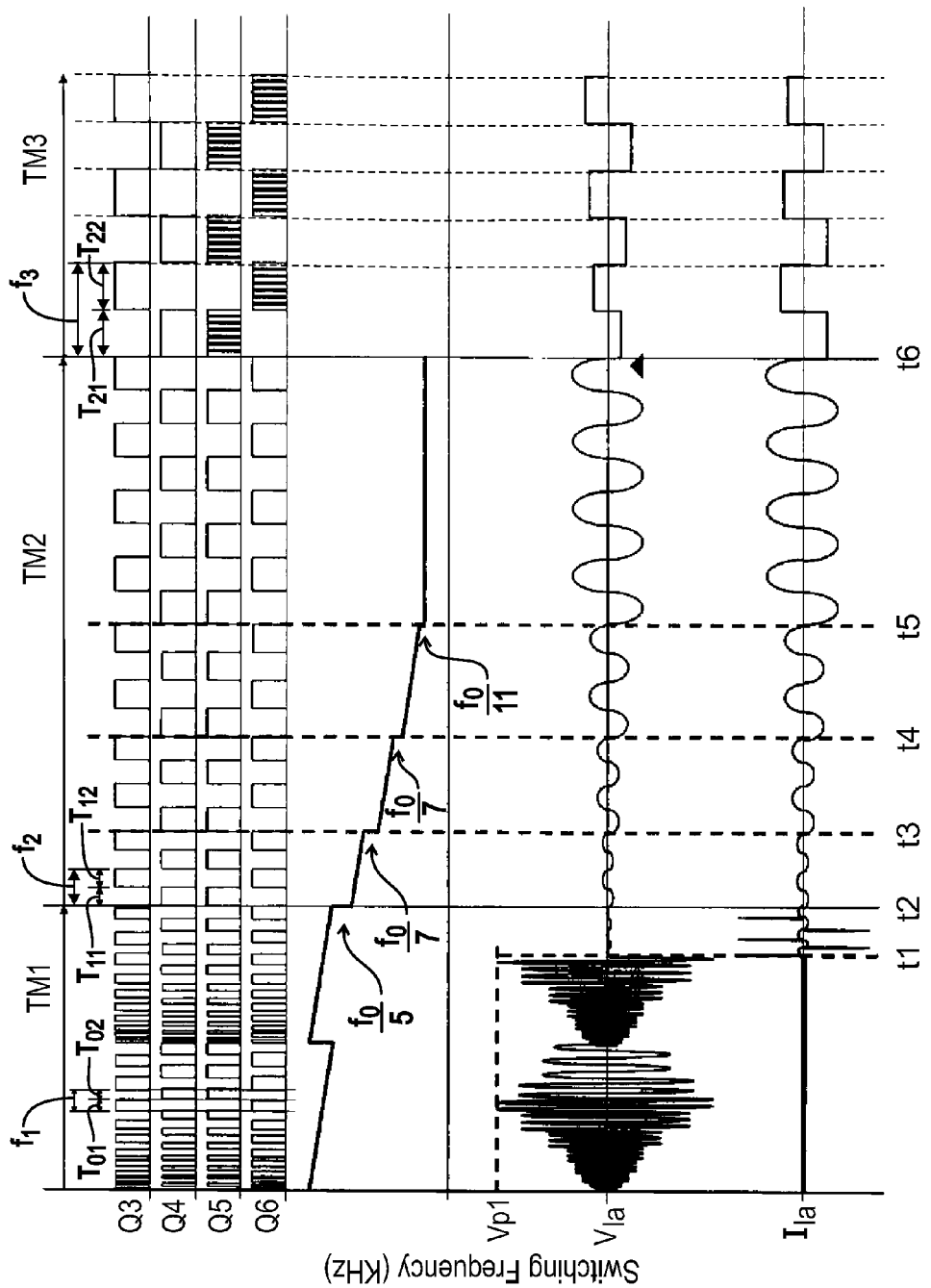
FIG. 12 is a waveform chart showing shifts from the electrical breakdown mode to the rectangular wave lighting mode according to another control method in the embodiment of FIG. 11.

However, switching of the switching frequency is not limited to the above-mentioned manner and may alternatively be as shown in FIG. 12. There, the switching frequency is shifted to f0/(2×n+1) at the time tn (n=2, 3, 4) after shift to the high frequency preheat mode TM2, lineally lowered from f0/(2×n+1) between the time tn to t(n+1) and finally switched to (f0/11) at the time t5.

Figure 13:
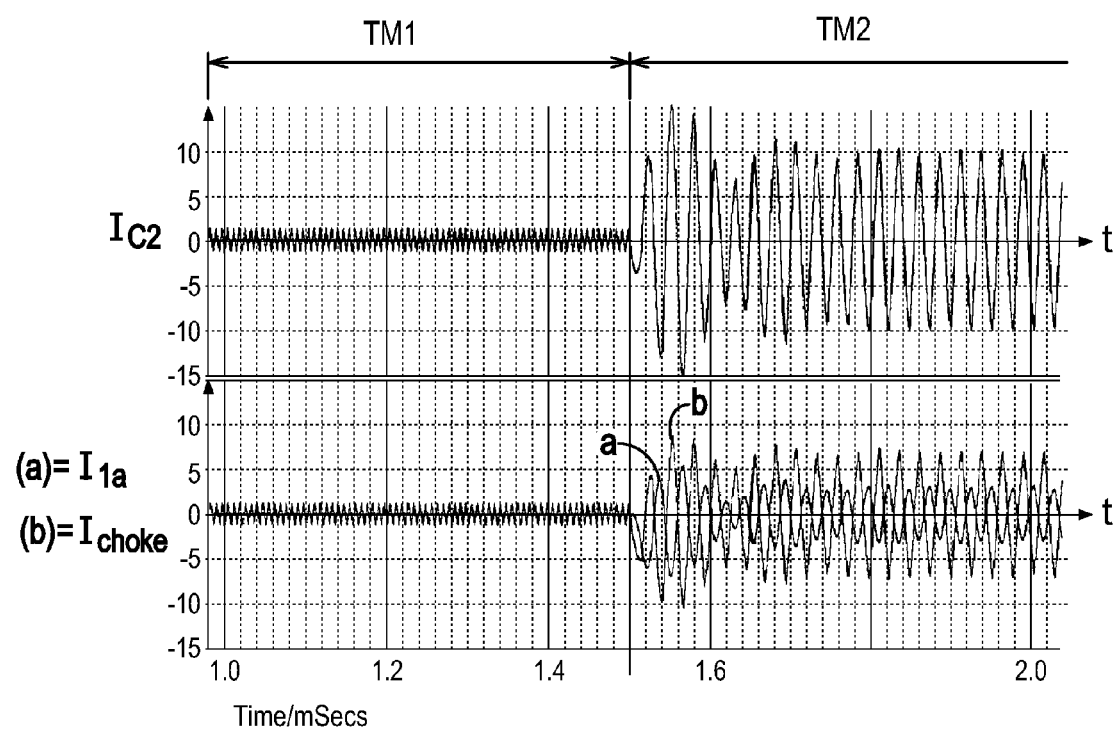
FIG. 13 is a current waveform chart showing shifts from the electrical breakdown mode to the high frequency preheat mode in the embodiment of FIG. 11.
Figure 14:
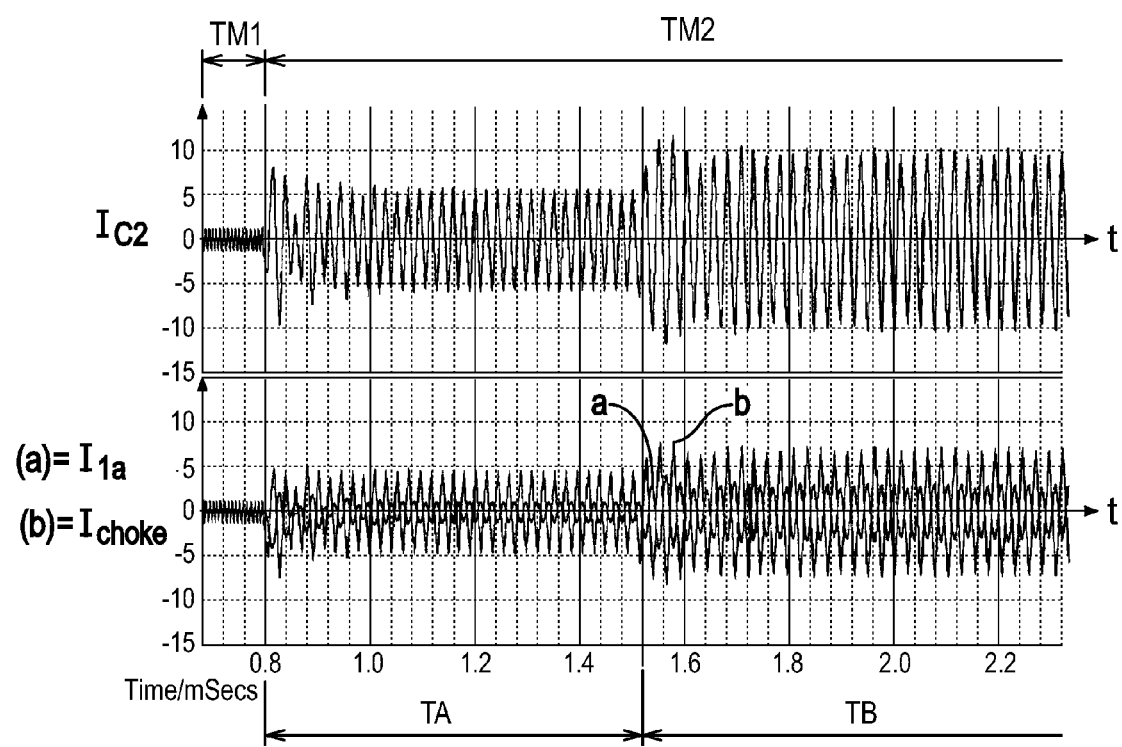
FIG. 14 is a current waveform chart showing shifts from the electrical breakdown mode to the high frequency preheat mode according to another control method in the embodiment of FIG. 11.

As shown in FIG. 13, in shifting operation from the electrical breakdown mode TM1 to the high frequency preheat mode TM2, when the switching frequency is directly switched from the first switching frequency f1 (for example, 140 kHz) to the second switching frequency f2 (for example, 39 kHz), a charging current (oscillating current) Ic2 to the capacitor C2 becomes excessive. Accordingly, as shown in FIG. 14, in switching of the mode, the first switching frequency f1 may be switched to a frequency which is lower than the switching frequency f1 and higher than the second switching frequency f2 (for example, 47 kHz) (period TA) and then to the second switching frequency f2 (for example, 39 kHz) (period TB), thereby reducing a peak of the charging current to the capacitor C2.

Although this embodiment of a method of switching the switching frequency in the high frequency preheat mode TM2 has been described with reference to the circuit as shown in FIG. 1, the switching frequency may be switched in an electronic ballast of various alternative and equivalent embodiments and the same effects as described above can be obtained.

Another embodiment of the present invention will be described referring to FIGS. 15(a)-(c). Light fixtures may be provided to accommodate the electronic ballast in various embodiments in a housing 20 and light the high pressure discharge lamp DL attached to a socket (not shown) in a fitting 21. The high pressure discharge lamp DL is lit by supplying power to the high pressure discharge lamp from the electronic ballast in the housing 20 through a cable 23 and the socket.

Because these lighting fixtures use the electronic ballast as previously described in various embodiments, even if fade-out occurs in shift from the electrical breakdown mode to the high frequency preheat mode, by applying the resonant voltage occurring in the LC resonant circuit 7a of the starting circuit 7 to between both the lamp electrodes of the high pressure discharge lamp DL, the high pressure discharge lamp DL can be easily lit and starting ability of the high pressure discharge lamp DL can be improved.

Figure 15A:
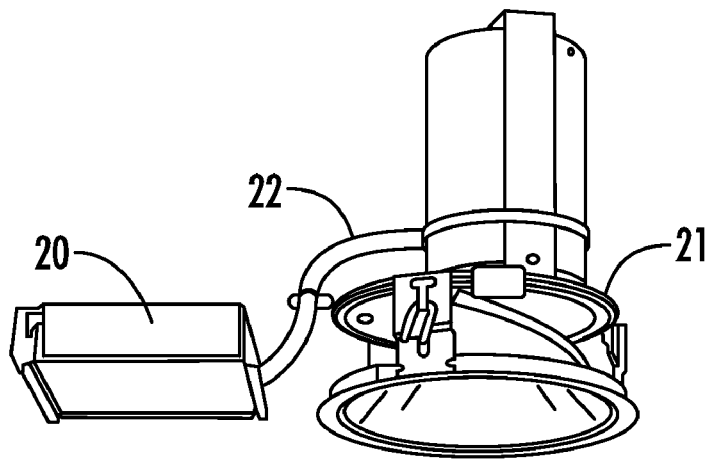
FIGS. 15(a) to (c) are exterior drawings of illumination devices using the electronic ballast of the present invention.
Figure 15B:
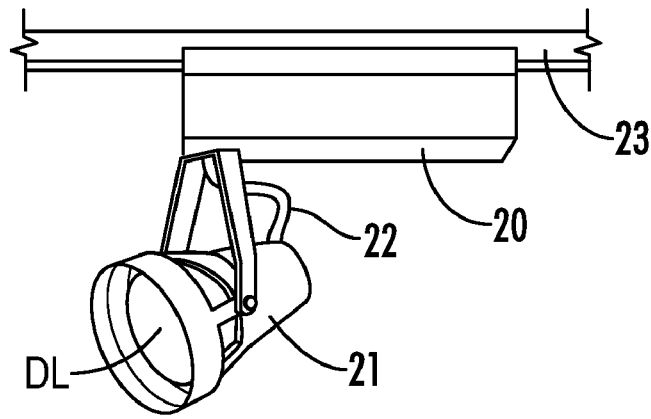
Figure 15C:
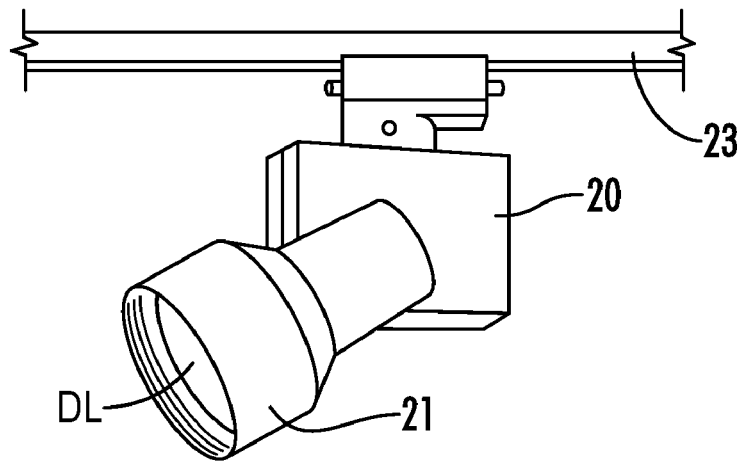

FIG. 15(a) shows a lighting fixture using the high pressure discharge lamp DL such as an HID lamp as a downlight. FIGS. 15(b) and (c) show fixtures which use the high pressure discharge lamp DL, such as an HID lamp, as a spotlight and hang and support the fitting 21 from the housing 20 movably attached to a wiring duct rail 23 for feeding commercial power.

Thus, although there have been described particular embodiments of the present invention of a new and useful High-Pressure Discharge Lamp Ballast with Multi-Mode Lamp Starting Circuit, it is not intended that such references be construed as limitations upon the scope of this invention except as set forth in the following claims.

What is claimed is:

1. An electronic ballast comprising:
a rectifier circuit coupled to receive an AC power signal and rectify said AC signal into a rectified DC signal;
a DC step-up chopper circuit coupled to said rectifier circuit and arranged to convert the rectified DC signal into a desired DC output signal;
an inverter circuit coupled to the DC chopper circuit and further comprising a plurality of switching elements for converting said DC output signal into a rectangular wave AC signal and supplying the AC signal to a high pressure discharge lamp;
a starting circuit including an LC resonant circuit, the starting circuit arranged to generate a starting voltage sufficient for producing electrical breakdown of the high pressure discharge lamp; and
a control circuit configured for controlling on/off positions for said switching elements dependent on an operating mode, the control circuit further configured to shift operation of the starting circuit and the inverter circuit among at least three operating modes comprising
an electrical breakdown mode for producing electrical breakdown of the high pressure discharge lamp,
a high frequency preheat mode for supplying a preheat current to the high pressure discharge lamp and preheating lamp electrodes, and
a rectangular wave lighting mode for supplying the rectangular wave AC to the high pressure discharge lamp to maintain steady state lighting of the high pressure discharge lamp,
wherein the control circuit in the electrical breakdown mode is further configured to control at least one of the switching elements to switch on and off around a first switching frequency which is $1/(n)$ of a resonant frequency of the LC circuit at no load, wherein (n) is an odd integer, and further wherein a first voltage is generated that is sufficient for starting the lamp, and
wherein the control circuit in the high frequency preheat mode is further configured to control at least one of the switching elements to switch on and off around a second switching frequency which is $1/(n)$ of the resonant frequency of the LC circuit at no load, wherein (n) is an odd integer, the second switching frequency lower than the first switching frequency, wherein a second voltage is generated that is effective for restarting the lamp.

2. The electronic ballast according to claim 1, wherein the control circuit in the electrical breakdown mode is further configured to sweep the switching frequency of the at least one switching element in a first predetermined frequency range including the first switching frequency.

3. The electronic ballast according to claim 2, wherein the control circuit in the high frequency preheat mode sweeps the switching frequency of the at least one switching element in a second predetermined frequency range including the second switching frequency.

4. The electronic ballast according to claim 3, wherein the second predetermined frequency range includes a frequency band greater than but near to frequency characteristics of the LC resonant circuit and the load circuit with the high pressure discharge lamp in a lit condition.

5. The electronic ballast according to claim 3, wherein the control circuit in shifting from the electrical breakdown mode to the high frequency preheat mode is further configured to gradually lower the switching frequency of the at least one switching element over time from around the first switching frequency to around the second switching frequency.

6. The electronic ballast according to claim 3, wherein the control circuit in shifting from the electrical breakdown mode to the high frequency preheat mode is further configured to lower the switching frequency of the at least one switching element from around the first switching frequency to around the second switching frequency in stages.

7. The electronic ballast according to claim 6, wherein the control circuit is further configured to set at least one intermediate frequencies which are lower than the first switching frequency and higher than the second switching frequency and are equal to $1/(n)$ of the resonant frequency, and to lower the switching frequency in stages from the first switching frequency to the second switching frequency through the one or more intermediate frequencies.

8. An electronic ballast comprising:
a power supply circuit configured to receive an AC input from a commercial source and to provide a DC output in response to the AC input;
an inverter circuit having a plurality of switching elements, the inverter circuit configured to convert the DC output into an AC signal and apply the AC signal to a high-pressure discharge lamp;
an LC resonant circuit coupled between the inverter circuit and the lamp; and
a control circuit configured to control the switching operation of at least one switching element of the inverter circuit, the switching control associated with a plurality of operating modes including
an electrical breakdown mode wherein the at least one switching element is controlled to turn on/off at a first switching frequency effective to provide a first resonant voltage and produce electrical breakdown of the high pressure discharge lamp from an unlit state,
a high frequency preheat mode wherein the at least one switching element after startup of the lamp is controlled to turn on/off at a second switching frequency lower than the first switching frequency, the second switching frequency effective to provide a current for preheating lamp electrodes, the second switching frequency further effective to provide a second resonant voltage and reproduce electrical breakdown of the high pressure discharge lamp in response to a fade out during preheating of the lamp electrodes, and
a rectangular wave lighting mode, wherein the at least one switching element after preheating of the lamp electrodes is controlled to turn on/off at a third switching frequency effective to supply a rectangular wave AC signal to the high pressure discharge lamp and maintain steady state lighting of the high pressure discharge lamp.

9. The ballast of claim 8, wherein in the electrical breakdown mode the at least one switching element is controlled to sweep through a first predetermined range including the first switching frequency, and wherein the first switching frequency is $1/(n)$ of a resonant frequency for the LC resonant circuit, further wherein (n) is an odd integer.

10. The ballast of claim 9, wherein in the high frequency preheat mode the at least one switching element is controlled to sweep through a second predetermined range including the second switching frequency that is lower than the first switching frequency, and wherein the second switching frequency is $1/(n)$ of the resonant frequency, further wherein (n) is an odd integer.

11. The ballast of claim 8, the power supply circuit further comprising a rectifier circuit having input terminals to receive AC power from a commercial power source and effective to rectify the AC power into DC power;

a DC step-up chopper circuit coupled between the rectifier circuit and the inverter circuit, and effective to convert the rectified DC power into the DC output signal to the inverter; and a DC step-up chopper control circuit configured to control the DC output signal.

12. The ballast of claim 11, the power supply further comprising a DC step-down chopper circuit coupled between the DC step-up chopper circuit and the inverter circuit; and a DC step-down chopper control circuit configured to further control the DC output signal to the inverter circuit.

13. The ballast of claim 8, the inverter circuit further comprising a first pair of switching elements arranged in a half-bridge circuit in parallel with the power supply circuit.

14. The ballast of claim 13, the inverter circuit further comprising a second pair of switching elements arranged in parallel with the first pair of switching elements, wherein in the rectangular wave lighting mode the switching elements in the first pair alternately switch on/off at the third switching frequency, the third switching frequency lower than the second switching frequency, and wherein in the rectangular wave lighting mode a first switching element in the second pair switches on/off at a fourth switching frequency in association with a first switching element in the first pair being turned on, the fourth switching frequency being relatively high with respect to the third frequency, and a second switching element in the second pair switches on/off at the fourth switching frequency in association with a second switching element in the first pair being turned on.

15. A method of operating an electronic ballast to power a high-pressure discharge lamp, the ballast including a power supply circuit, an inverter circuit having a plurality of switching elements, an LC resonant circuit coupled to the inverter circuit and to the lamp, and a switching control circuit, the method comprising:

receiving a power input at the power supply circuit from a power source and providing a DC output signal to the inverter circuit;

controlling at least one switching element to switch on and off at a first frequency equal to 1/(n) of a resonant frequency of the resonant circuit, wherein (n) is an odd integer, the first switching frequency associated with a first voltage sufficient to cause electrical breakdown in the lamp from an unlit state;

controlling the at least one switching element after startup of the lamp to switch on and off at a second frequency less than the first frequency and equal to 1/(n) of the resonant frequency, wherein (n) is an odd integer, the second switching frequency associated with a current sufficient to preheat the electrodes of the lamp and further associated with a second voltage sufficient to reproduce electrical breakdown in the lamp in response to a fade out condition in the lamp occurring during electrode preheating; and controlling at least one switching element in the inverter circuit after preheating of the lamp electrodes to supply a rectangular wave AC signal to the lamp and maintain steady state lighting of the lamp.

16. The method of claim 15, wherein controlling at least one switching element in the inverter circuit after preheating of the lamp electrodes to supply a rectangular wave AC signal to the lamp and maintain steady state lighting of the lamp further comprises the steps of controlling a first pair of switching elements in the inverter circuit to alternately switch on/off at a third switching frequency lower than the second switching frequency;

controlling a first switching element in a second pair of switching elements in the inverter circuit to switch on/off at a fourth switching frequency in association with a first switching element in the first pair being turned on, the fourth switching frequency being relatively high with respect to the third frequency; and controlling a second switching element in the second pair of switching elements to switch on/off at the fourth switching frequency in association with a second switching element in the first pair being turned on.

17. The method of claim 15, wherein controlling at least one switching element to switch on and off at a first frequency further comprises controlling at least one switching element to switch on and off at a plurality of frequencies sweeping through a first predetermined range including the first frequency equal to 1/(n) of a resonant frequency of the resonant circuit.

18. The method of claim 17, wherein controlling the at least one switching element to switch on and off at a second frequency further comprises controlling the at least one switching element to switch on and off at a plurality of frequencies sweeping through a second predetermined range including a second frequency lower than the first frequency and equal to 1/(n) of a resonant frequency of the resonant circuit, wherein (n) is an odd integer.

19. The method of claim 15, further comprising gradually decreasing the switching frequency of the at least one switching element over time from around the first switching frequency to around the second switching frequency.

20. The method of claim 15, further comprising lowering the switching frequency of the at least one switching element from around the first switching frequency to around the second switching frequency in stages.

21. The method of claim 20, further comprising setting at least one intermediate switching frequency, each intermediate frequency lower than the first switching frequency and higher than the second switching frequency and equal to 1/(n) of the resonant frequency, wherein (n) is an odd integer, and lowering the switching frequency in stages from the first switching frequency to the second switching frequency through the one or more intermediate frequencies.

* * * * *